(12) United States Patent
Satoh et al.

(10) Patent No.: US 11,417,023 B2
(45) Date of Patent: Aug. 16, 2022

(54) IMAGE PROCESSING DEVICE, IMAGE PROCESSING METHOD, AND PROGRAM

(71) Applicant: Sony Corporation, Tokyo (JP)

(72) Inventors: Ryuta Satoh, Tokyo (JP); Shun Lee, Tokyo (JP); Keitaro Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/280,192

(22) PCT Filed: Sep. 13, 2019

(86) PCT No.: PCT/JP2019/036082
§ 371 (c)(1),
(2) Date: Mar. 26, 2021

(87) PCT Pub. No.: WO2020/071091
PCT Pub. Date: Apr. 9, 2020

(65) Prior Publication Data
US 2021/0350578 A1    Nov. 11, 2021

(30) Foreign Application Priority Data

Oct. 4, 2018  (JP) .............................. JP2018-189010

(51) Int. Cl.
*G06T 7/90* (2017.01)
*G06T 7/80* (2017.01)
(Continued)

(52) U.S. Cl.
CPC .............. *G06T 7/90* (2017.01); *G06T 7/0002* (2013.01); *G06T 7/80* (2017.01); *H04N 17/002* (2013.01); *G06T 2207/10024* (2013.01)

(58) Field of Classification Search
CPC ........... G06T 7/90; G06T 7/80; G06T 7/0002; G06T 2207/10024
See application file for complete search history.

(56) References Cited

U.S. PATENT DOCUMENTS 7,894,667 B2 * 2/2011 Fukuda ................. H04N 5/265
                                                    382/167
8,064,691 B2 * 11/2011 Meyer ..................... G06T 7/11
                                                    382/165
(Continued)

FOREIGN PATENT DOCUMENTS

JP    2000-324502 A    11/2000
JP    2003-153859 A     5/2003
(Continued)

OTHER PUBLICATIONS

International Search Report and Written Opinion dated Nov. 19, 2019, received for PCT Application PCT/JP2019/036082, Filed on Sep. 13, 2019, 10 pages including English Translation.

*Primary Examiner* — Brian P Yenke
(74) *Attorney, Agent, or Firm* — Xsensus LLP

(57) ABSTRACT

A comparison area detection unit of image processing circuitry detects an image area of a fading determination object on the basis of an image signal generated by an image capturing unit using a color filter as a comparison area. A color information generation unit generates color information from the image signal of the comparison area and uses the color information as comparison target information. A color information comparison unit compares the color information of the fading determination object as fading determination reference information with the comparison target information. A fading information generation unit generates fading information indicating that a fading level of the color filter exceeds a predetermined level or the fading level of the color filter on the basis of comparison information indicating a comparison result between the fading determination reference information and the comparison target information. The fading state of the color filter can be detected with precision.

12 Claims, 13 Drawing Sheets

(51) Int. Cl.
  *G06T 7/00*    (2017.01)
  *H04N 17/00*   (2006.01)

(56) References Cited

U.S. PATENT DOCUMENTS

| | | | |
|---|---|---|---|
| 10,580,149 B1* | 3/2020 | Lakshminarayanan | ..................... H04N 5/23203 |
| 10,812,708 B2* | 10/2020 | Johnson | ............. H04N 5/23229 |
| 11,172,173 B2* | 11/2021 | Zhang | .................... H04N 9/646 |
| 2006/0017743 A1* | 1/2006 | Chan | ........................ G09G 5/06 345/589 |
| 2009/0244360 A1* | 10/2009 | Ueda | ................ H04N 5/232411 348/360 |
| 2009/0273679 A1* | 11/2009 | Gere | .................. H04N 9/04557 348/187 |
| 2010/0231603 A1* | 9/2010 | Kang | .................. G09G 3/3426 345/591 |
| 2012/0057055 A1 | 3/2012 | Yokogawa | |
| 2012/0326011 A1* | 12/2012 | Ichimura | .......... H01L 31/02327 250/208.1 |
| 2015/0070528 A1* | 3/2015 | Kikuchi | ............. H04N 5/23229 348/224.1 |
| 2016/0119617 A1* | 4/2016 | Sagar | ................ H04N 5/23222 348/187 |
| 2020/0275019 A1 | 8/2020 | Johnson | |
| 2021/0152727 A1* | 5/2021 | Kanzaki | ................ H04N 9/646 |

FOREIGN PATENT DOCUMENTS

| | | | |
|---|---|---|---|
| JP | 2011-103513 A | 5/2011 | |
| JP | 2012-59865 A | 3/2012 | |

* cited by examiner

FIG. 5
(a)
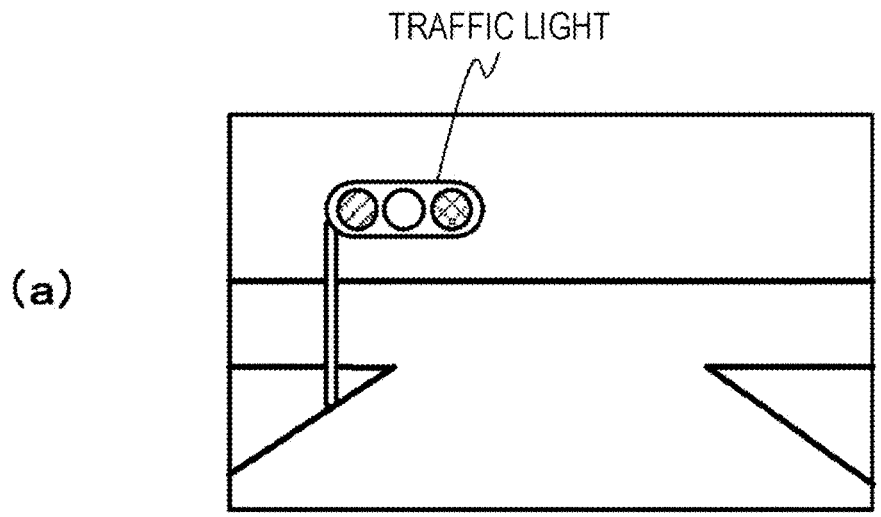
(b)
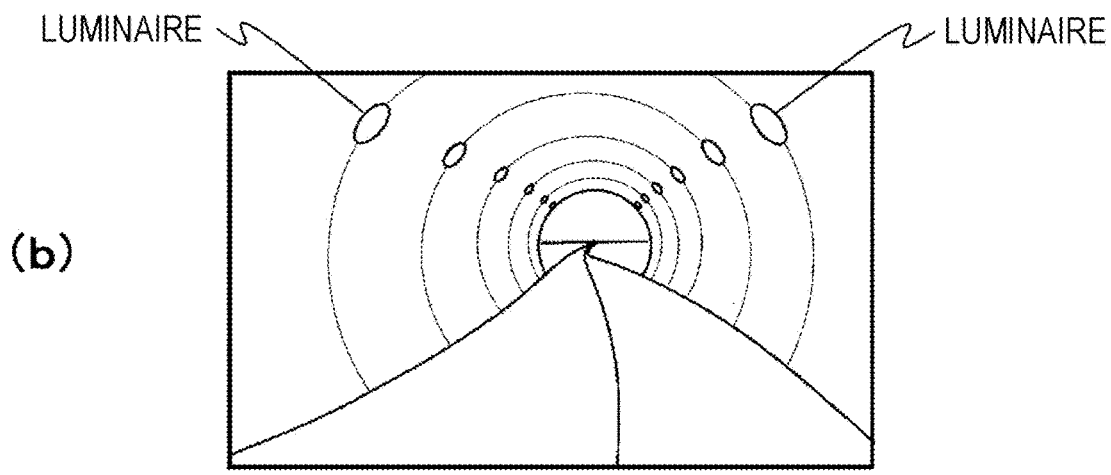
(c)
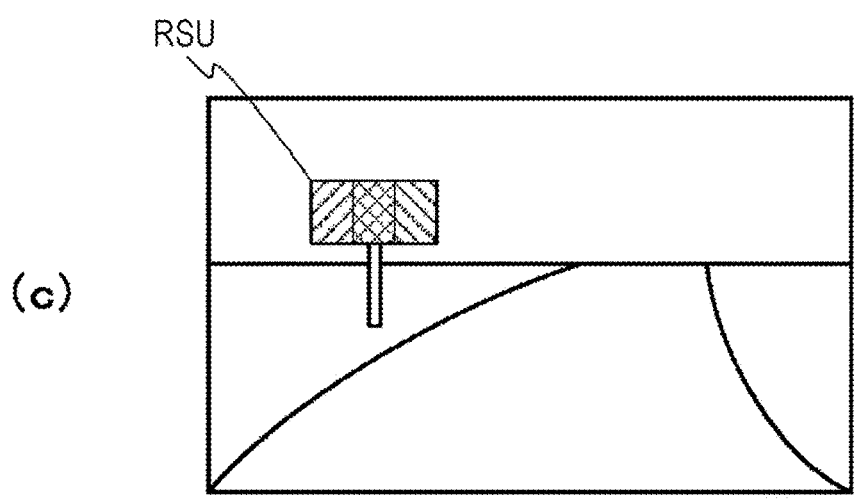

IMAGE PROCESSING DEVICE, IMAGE PROCESSING METHOD, AND PROGRAM

CROSS-REFERENCE TO RELATED APPLICATIONS

The present application is based on PCT filing PCT/JP2019/036082, filed Sep. 13, 2019, which claims priority to JP 2018-189010, filed Oct. 4, 2018, the entire contents of each are incorporated herein by reference.

TECHNICAL FIELD

This technology relates to an image processing device, an image processing method, and a program, and enables detection of a fading state of a color filter with precision.

BACKGROUND ART

For a color filter mounted on the front surface of an image capturing element, it is known that fading is accelerated by long-time exposure and the performance deteriorates. Therefore, in Patent Document 1, when cumulative exposure time, which is the sum of time when a shutter is open, exceeds limit exposure time of the image capturing element, notification about this fact is made.

CITATION LIST

Patent Document

Patent Document 1: Japanese Patent Application Laid-Open No. 2011-103513

SUMMARY OF THE INVENTION

Problems to be Solved by the Invention

In that connection, when capturing a moving image, for example, in a case where a dark scene is captured and in a case where a bright scene is captured, an amount of incident light of the image capturing element is different between the two cases even if image capturing time is the same. Therefore, as shown in Patent Document 1, the fading state cannot be determined with precision by using cumulative exposure time, which is the sum of time when the shutter is open.

Therefore, an object of this technology is to provide an image processing device, an image processing method, and a program that can detect the fading state of a color filter with precision.

Solutions to Problems

A first aspect of this technology is
an image processing device including
a fading information generation unit configured to generate fading information indicating fading of a color filter on the basis of comparison target information based on an image signal generated by an image capturing unit using the color filter and fading determination reference information.

In this technology, color information generated from the image signal generated by the image capturing unit using the color filter is used as the comparison target information. Furthermore, color information in a case where there is no fading of the color filter is used as the fading determination reference information. This comparison target information is compared with the fading determination reference information, and the fading information is generated on the basis of a comparison result. In the Image processing device, for example, an image area of a fading determination object is detected as a comparison area on the basis of the image signal generated by the image capturing unit, and the color information generated from the image signal of the comparison area is used as the comparison target information. Furthermore, detection of the comparison area may be performed according to a fading level estimated on the basis of the comparison result, and detection of the comparison area may be performed within an image area set in advance.

Furthermore, the image capturing unit may be provided with a color component pixel provided with a color filter and a reference pixel in which fading does not occur. The color information generated from the image signal generated in the color component pixel may be used as the comparison target information, and the color information generated on the basis of a signal of the reference pixel may be used as the fading determination reference information. The reference pixel is, for example, a pixel provided with no color filter, or a pixel provided with a spectral filter instead of the color filter.

Comparison information indicating the comparison result of the comparison target information and the fading determination reference information is accumulated, and on the basis of the accumulated comparison information, the fading information indicating that the fading level of the color filter exceeds a predetermined level or the fading level of the color filter is generated.

Furthermore, illuminance information generated on the basis of the image signal, or the illuminance information and environmental information when the image signal is generated are accumulated. The accumulated illuminance information or illuminance information and environmental information are used as the comparison target information. Information indicating the relationship between the fading level of the color filter and an accumulation result of the illuminance information or environmental information is used as the fading determination reference information. On the basis of the comparison target information and the fading determination reference information, the fading information indicating that the fading level of the color filter exceeds a predetermined level or the fading level of the color filter is generated.

A second aspect of this technology is
an image processing method including
generating, by a fading information generation unit, fading information indicating fading of a color filter on the basis of comparison target information based on an image signal generated by an image capturing unit using the color filter and fading determination reference information.

A third aspect of this technology is a program for causing a computer to execute generation of information regarding a color filter used in an image capturing unit, the program configured to cause the computer to perform:
generating comparison target information on the basis of an image signal generated by the image capturing unit using the color filter; and
generating fading information indicating fading of the color filter on the basis of the comparison target information and fading determination reference information.

Note that the program of the present technology is, for example, a program that can be provided by a storage medium provided in a computer-readable format, communication medium, for example, a storage medium such as an optical disk, a magnetic disk, and a semiconductor memory, or a communication medium such as a network to a general-

BRIEF DESCRIPTION OF DRAWINGS

FIG. 5 is a diagram illustrating objects without fading.

MODE FOR CARRYING OUT THE INVENTION

Figure 1:
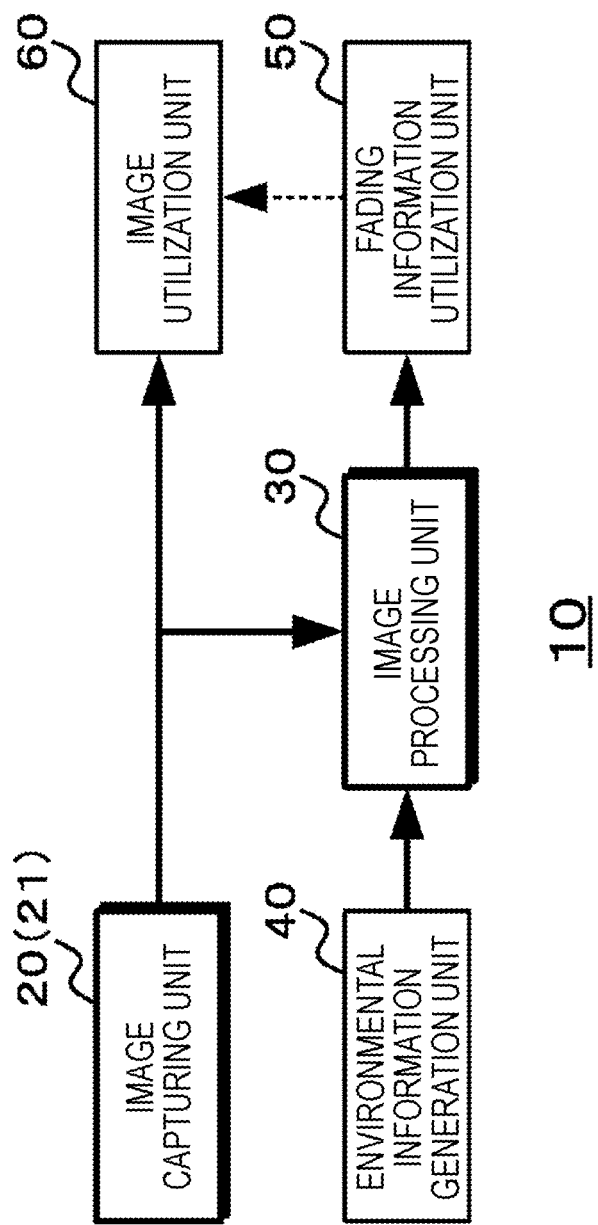
FIG. 1 is a diagram showing a configuration of an image capturing system.

A mode for carrying out the present technology will be described below. Note that the description will be made in the following order.
1. About image capturing system
2. First Embodiment
2-1. Configuration of first embodiment
2-2. Operation of first embodiment
3. Second Embodiment
3-1. Configuration of second embodiment
3-2. Operation of second embodiment
4. Third Embodiment
4-1. Configuration of third embodiment
4-2. Operation of third embodiment
5. Other embodiments
6. About fading information utilization unit
7. Application example

1. About Image Capturing System

FIG. 1 shows a configuration of an image capturing system using an image processing device of the present technology. An image capturing system 10 includes an image capturing unit 20 (21) and an image processing unit 30. Furthermore, the image capturing system 10 may be provided with an environmental information generation unit 40, a fading information utilization unit 50, and an image utilization unit 60.

The image capturing unit 20 (21) includes an image capturing element such as a complementary metal oxide semiconductor (CMOS) or charge coupled device (CCD). Furthermore, a color filter is provided on the image capturing surface side of the image capturing element. The image capturing unit 20 performs photoelectric conversion on a subject optical image, generates an image signal according to the subject optical image, and outputs the image signal to the image processing unit 30 and the fading information utilization unit 50 or the image utilization unit 60. Furthermore, the image capturing unit 21 generates and outputs the image signal and a reference signal to the image processing unit 30 as described later.

The image processing unit 30 generates fading information indicating fading of the color filter by using comparison target information based on the image signal generated by the image capturing unit 20 (21) using the color filter and fading determination reference information for determining the fading of the color filter. The image processing unit 30 may, for example, generate color information from the image signal for use as the comparison target information, or accumulate illuminance information generated on the basis of the image signal, or accumulate the illuminance information and environmental information when the image signal is generated for use as the comparison target information. Furthermore, the image processing unit 30 may use color information without fading, for example, color information of an object without fading, or color information based on a signal generated in a reference pixel in which fading does not occur as the fading determination reference information. The image processing unit 30 may use information indicating a relationship between an accumulation result of the illuminance information or an accumulation result of the illuminance information and the environmental information and a fading level of the color filter as the fading determination reference information. The image processing unit 30 compares the comparison target information with the fading determination reference information, determines the fading of the color filter on the basis of a comparison result, and generates the fading information. The image processing unit 30 outputs the generated fading information to the fading information utilization unit 50.

The environmental information generation unit 40 includes a sensor that detects an image capturing environment, detects the environment when an image is captured, for example, a temperature when an image is captured, and outputs image capturing environmental information indicating the detected temperature to the image processing unit 30.

The fading information utilization unit 50 issues a warning about fading and performs control corresponding to the fading on the basis of the fading information generated by the image processing unit 30. For example, the fading information utilization unit 50 presents a warning display or a warning sound to a user when the fading information indicates that fading exceeding a predetermined level has occurred. Furthermore, in a case where a plurality of image capturing units 20 (21) is provided in the image capturing system 10 in a switchable manner, when the fading information indicates that fading exceeding a predetermined level has occurred, switching to another image capturing unit may be performed. Moreover, the fading information utilization unit 50 may correct the fading of the image signal generated by the image capturing unit 20 (21) on the basis of the fading information.

The image utilization unit 60 performs application operations such as, for example, driving control and monitoring, recording of the image signal, and the like, by using the image signal acquired by the image capturing unit 20 (21) or the image signal with the fading corrected by the fading information utilization unit 50.

2. First Embodiment

Next, the first embodiment of the present technology will be described. The first embodiment shows a case where the color information generated from the image signal is used as the comparison target information, and the color information on an object without fading is used as the fading determination reference information.

2-1. Configuration of First Embodiment

Figure 2:
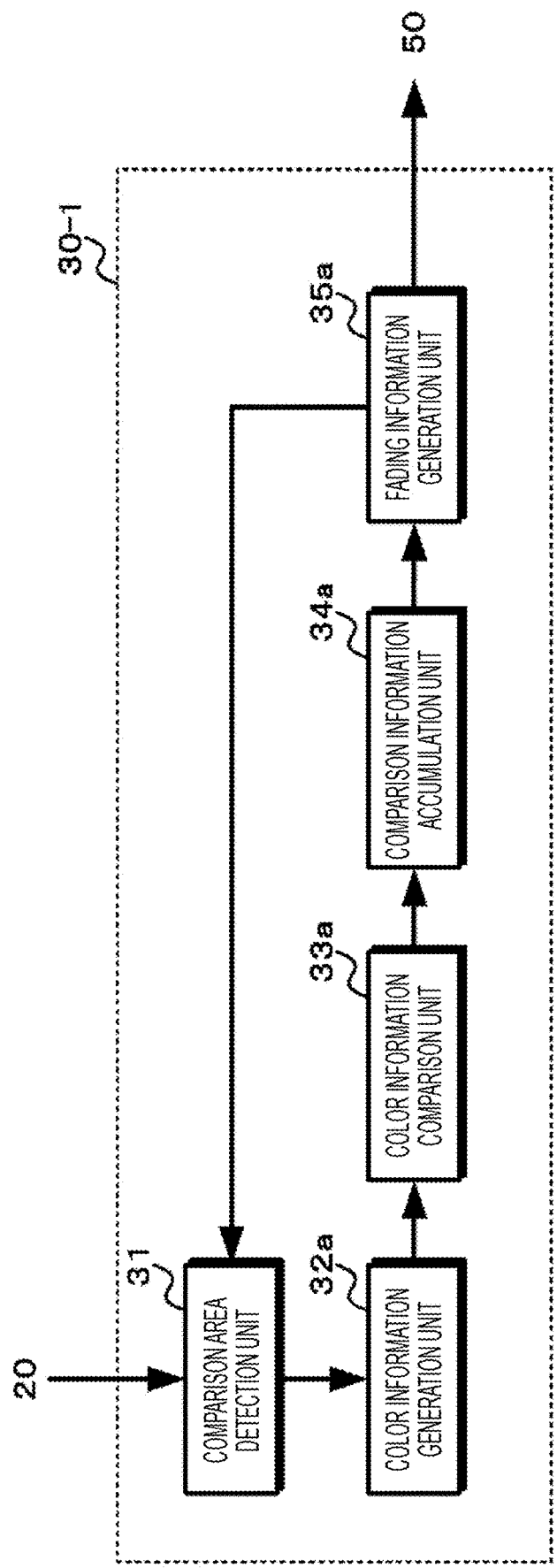
FIG. 2 is a diagram illustrating a configuration of a first embodiment.

FIG. 2 illustrates the configuration of the first embodiment. The image processing unit 30-1 includes a comparison area detection unit 31, a color information generation unit 32*a*, a color information comparison unit 33*a*, a comparison information accumulation unit 34*a*, and a fading information generation unit 35*a*.

The comparison area detection unit 31 recognizes a subject by using the image signal generated by the image capturing unit 20, and detects an image area of an object without fading as a comparison area. The comparison area detection unit 31 outputs the image signal of the detected comparison area to the color information generation unit 32*a*. Furthermore, as described later, the fading information generation unit 35*a* may notify the comparison area detection unit 31 of the fading level, and the comparison area detection unit 31 may perform recognition processing according to the fading level. For example, the comparison area detection unit 31 switches a dictionary to be used for the recognition processing according to the notified fading level. If the subject is recognized in this way, the comparison area can be detected with precision regardless of a fading state of the color filter. Furthermore, the comparison area detection unit 31 may set a subject recognition area according to the object to be detected as the comparison area. For example, as described later with reference to FIG. 5, in a case where a traffic light or a luminaire is detected as detection of an object without fading, since the traffic light or luminaire is located on the upper side of the image center of a captured image, if an area on the upper side of the image center is set as the subject recognition area in the captured image, the traffic light or luminaire can be efficiently detected.

The color information generation unit 32*a* outputs color information, for example, color information indicating the level of each color component of the three primary colors from the image signal of the comparison area detected by the comparison area detection unit 31 to the color information comparison unit 33*a* as the comparison target information.

The color information comparison unit 33*a* stores in advance the color information on the object without fading as the fading determination reference information. The color information comparison unit 33*a* compares the color information generated by the color information generation unit 32*a* (comparison target information) with the color information on the object detected by the comparison area detection unit 31 (fading determination reference information). The color information comparison unit 33*a* generates comparison information indicating a ratio of the comparison target information to the fading determination reference information (fading level) or whether or not fading with the fading level exceeding a predetermined level has occurred. The color information comparison unit 33*a* outputs the generated comparison information to the comparison information accumulation unit 34*a*.

The comparison information accumulation unit 34*a* accumulates the comparison information generated by the color information comparison unit 33*a*. Furthermore, the comparison information accumulation unit 34*a* outputs accumulated comparison information, which is an accumulation result of the comparison information, to the fading information generation unit 35*a*.

The fading information generation unit 35*a* performs statistical processing and the like on the accumulated comparison information supplied from the comparison information accumulation unit 34*a* to calculate fading determination information. For example, on the basis of the accumulated comparison information, when it is shown by the most recently accumulated comparison information that fading has occurred more than a predetermined level set in advance, the fading information generation unit 35*a* calculates a duration period and the number of continuations of the comparison result indicating that fading has occurred more than the predetermined level as the fading determination information. Furthermore, the fading information generation unit 35*a* may estimate the current fading level on the basis of the accumulated comparison information and output the estimated fading level to the comparison area detection unit 31. In a case where the duration period and the number of continuations of the comparison result indicating that fading has occurred more than the predetermined level exceed a threshold, the fading information generation unit 35*a* determines that fading has occurred, generates the fading information indicating that the fading has occurred, and outputs the fading information to the fading information utilization unit 50. Furthermore, the fading information generation unit 35*a* may not only indicate that fading has occurred with the fading information, but also include the fading level in the fading information.

Note that the comparison information accumulation unit 34*a* is not an essential component, and the comparison information generated by the color information comparison unit 33*a* may be output to the fading information generation unit 35*a*. In a case where the comparison information accumulation unit 34*a* is provided, even if the comparison information generated by the color information comparison unit 33*a* varies, stable fading information can be generated on the basis of the accumulated comparison information. Furthermore, in a case where the comparison information accumulation unit 34*a* is not provided, the configuration of the image processing unit 30-1 can be simplified.

2-2. Operation of First Embodiment

Figure 3:
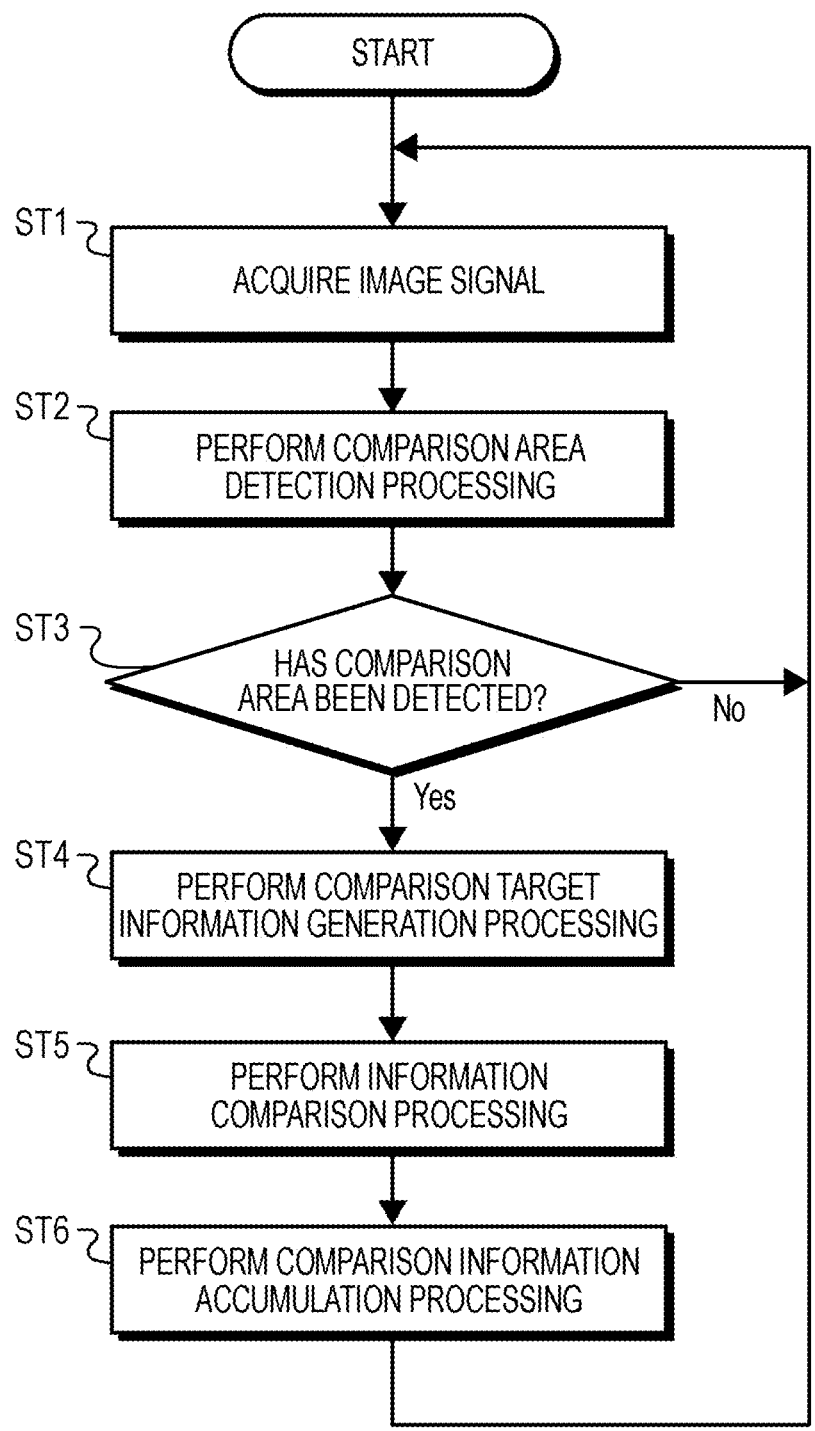
FIG. 3 is a flowchart illustrating an operation of the first embodiment.
Figure 4:
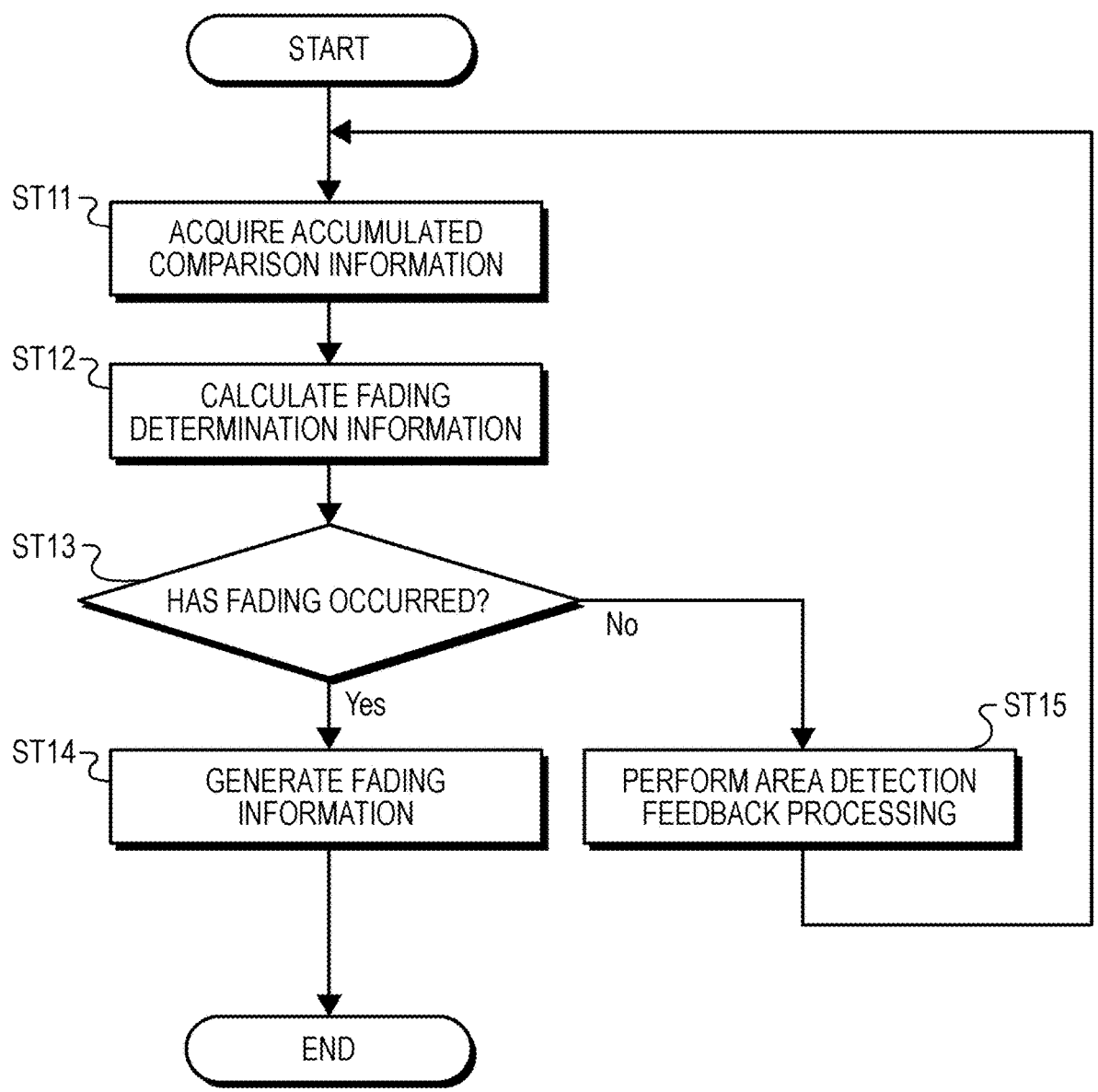
FIG. 4 is a flowchart illustrating the operation of the first embodiment.

FIGS. 3 and 4 are flowcharts illustrating operations of the first embodiment, and in FIG. 3, an operation of processing information to be used for determining fading is performed. Furthermore, FIG. 4 shows an operation of generating the fading information. The operation of processing information to be used for determining fading is performed during an operation of the image capturing unit, and the operation of generating the fading information is performed at predetermined period intervals.

In step ST1 of FIG. 3, the image processing unit acquires an image signal. The image processing unit 30-1 acquires the image signal generated by the image capturing unit 20 and proceeds to step ST2.

In step ST2, the image processing unit performs comparison area detection processing. The image processing unit 30-1 detects an image area indicating an object without fading in the image based on the image signal acquired in step ST1 as a comparison area. FIG. 5 illustrates objects without fading, and a traffic light whose color is clear as shown in (a) of FIG. 5 and luminaires and the like that emit illumination light of a predetermined wavelength as shown in (b) of FIG. 5 are objects to be detected as the comparison area. Furthermore, as shown in (c) of FIG. 5, a marker and the like of a predetermined color provided as a road side unit (RSU) may be used as an object to be detected as the comparison area. The image processing unit 30-1 performs the comparison area detection processing and proceeds to step ST3.

In step ST3, the image processing unit determines whether or not the comparison area has been detected. The image processing unit 30-1 proceeds to step ST4 in a case where the comparison area is detected in the comparison area detection processing of step ST2, or returns to step ST1 in a case where the comparison area is not detected.

In step ST4, the image processing unit performs comparison target information generation processing. The image processing unit 30-1 proceeds to step ST5 with the color information generated by using the image signal of the comparison area detected in step ST2 as the comparison target information.

In step ST5, the image processing unit performs information comparison processing. The image processing unit 30-1 compares the comparison target information generated in step ST4 with the fading determination reference information that is the color information of the object without fading registered in advance, generates comparison information on the basis of a comparison result, and proceeds to step ST6.

In step ST6, the image processing unit performs comparison information accumulation processing. The image processing unit 30-1 accumulates the comparison information generated in step ST5 and returns to step ST1.

In step ST11 of FIG. 4, the image processing unit acquires accumulated comparison information. The image processing unit 30-1 acquires the accumulated comparison information generated by accumulating the comparison information by the comparison information accumulation processing in step ST6 of FIG. 3, and proceeds to step ST12.

In step ST12, the image processing unit calculates fading determination information. The image processing unit 30-1 calculates the fading determination information on the basis of the accumulated comparison information acquired in step ST11. The image processing unit 30-1 calculates, for example, the duration period and the number of continuations of the comparison result indicating that fading has occurred more than a predetermined level as the fading determination information, and proceeds to step ST13.

In step ST13, the image processing unit determines whether or not fading has occurred. The image processing unit 30-1 determines whether or not the fading determination information calculated in step ST12 exceeds a threshold set in advance, proceeds to step ST14 in a case where it is determined on the basis of the fading determination information that fading exceeding a threshold has occurred, or proceeds to step ST15 in a case where it is determined on the basis of the fading determination information that no fading exceeding the threshold has occurred.

In step ST14, the image processing unit generates fading information. The image processing unit 30-1 generates the fading information indicating that fading exceeding a threshold has occurred in the color filter used in the image capturing unit 20, and the like.

In step ST15, the image processing unit performs area detection feedback processing. The image processing unit 30-1 estimates the current fading level on the basis of the accumulated comparison information acquired in step ST11 and feeds back the estimated fading level to the detection processing of the comparison area in step ST2 of FIG. 3, thereby allowing the comparison area to be detected with precision, then returns to step ST11.

In this way, the first embodiment allows the fading state to be detected with precision. Furthermore, it is possible to detect an image area of an object without fading from an image capturing surface and determine fading from color information of the detected area and color information of the object. Therefore, if the color information on the object without fading is stored in advance, fading of the color filter can be detected without using information and the like acquired by an external device.

3. Second Embodiment

Next, a second embodiment of the present technology will be described. The second embodiment shows a case of using color information generated from an image signal as comparison target information and color information based on a signal generated in a reference pixel in which fading does not occur as fading determination reference information.

3-1. Configuration of Second Embodiment

Figure 6:
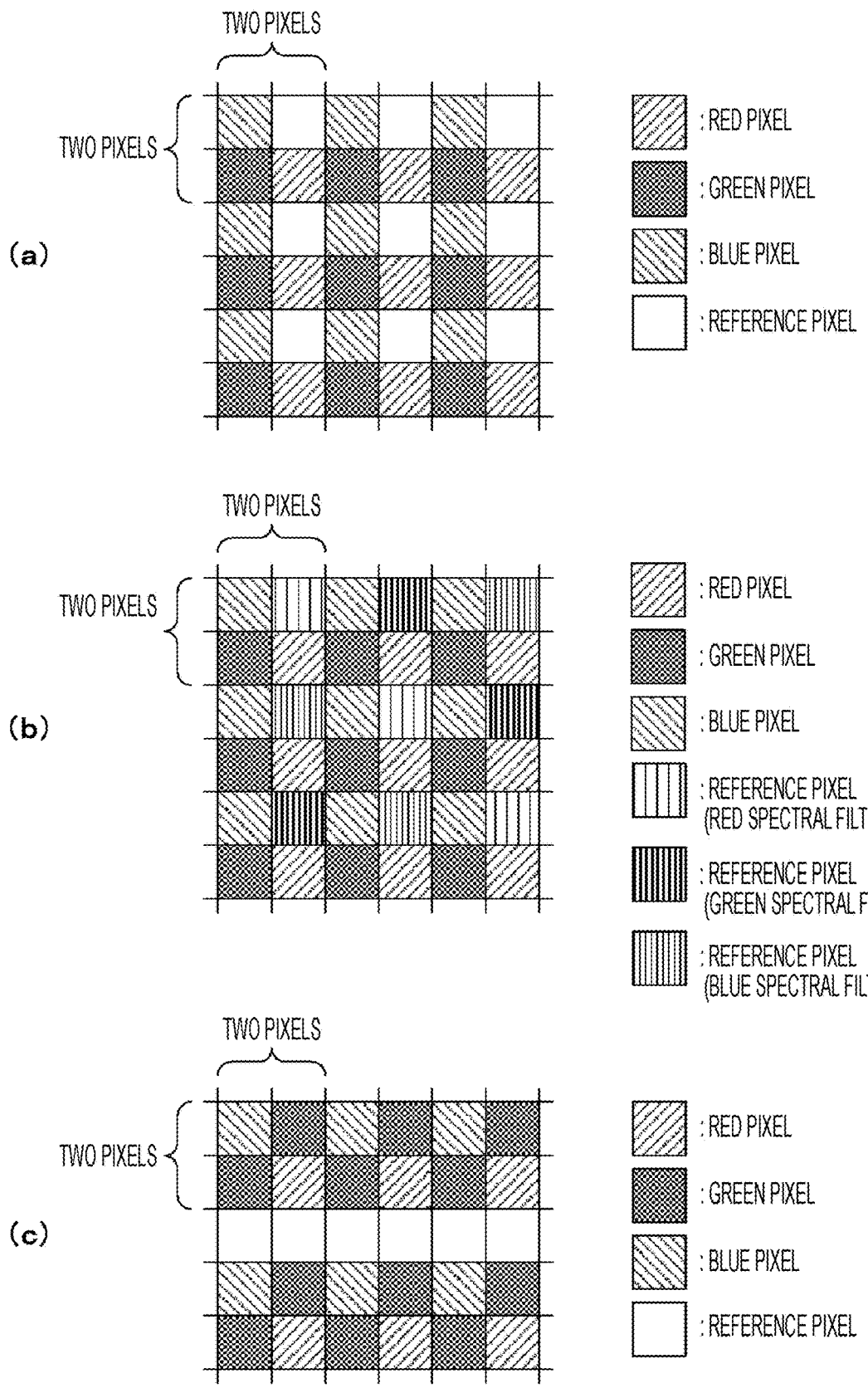
FIG. 6 is a diagram illustrating a configuration of an image capturing unit that generates an image signal and a reference signal.

FIG. 6 illustrates a configuration of an image capturing unit that generates an image signal and a reference signal. An image capturing element of an image capturing unit 21 includes color pixels provided with color filters and reference pixels in which fading does not occur.

(a) of FIG. 6 illustrates a case where the reference pixel is a pixel provided with no color filter. For example, a block of 2×2 pixels includes a red pixel, a green pixel, a blue pixel, and a reference pixel.

(b) of FIG. 6 illustrates a case where the reference pixel is a pixel provided with a spectral filter. As the spectral filter, for example, a filter using surface plasmon resonance is used (hereinafter referred to as "surface plasmon filter"). In the surface plasmon filter, a metal thin-film pattern having periodicity according to a wavelength of light transmitted through a surface of a dielectric is formed. The reference pixel generates a signal that is not affected by fading of the color filter. Note that in a case where the spectral filter is used as the reference pixel, the spectral filter (red, green, blue) is formed so as to transmit light having a wavelength equal to the wavelength of the color filter. Note that in (b) of FIG. 6, for example, the block of 2×2 pixels includes a red pixel, a green pixel, a blue pixel, and a reference pixel. Reference pixels of adjacent blocks use spectral filters of different colors.

(c) of FIG. 6 illustrates a case where the reference pixel is a pixel provided with no color filter, and the reference pixels are provided in a line direction. Note that arrangement of the reference pixels shown in FIG. 6 is an example and is not limited to the arrangement of FIG. 6.

The image capturing unit 21 outputs the image signal generated by reading a signal from the color pixel and the reference signal generated by reading a signal from the reference pixel without fading. Note that as shown in (a) of FIG. 6 or (b) of FIG. 6, if the reference pixels are provided for each pixel block including a plurality of pixels, the reference pixels can be arranged without imbalance. Furthermore, if arranged as shown in (c) of FIG. 6, the reference signal can be easily generated only by reading lines.

Figure 7:
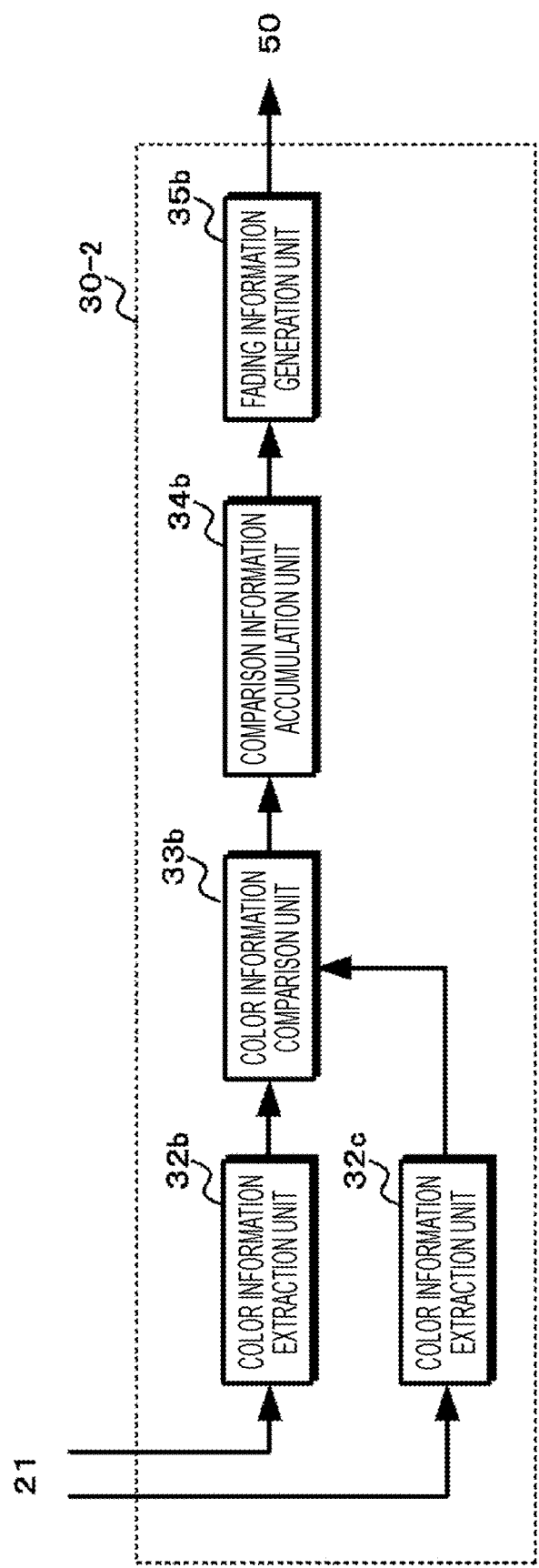
FIG. 7 is a diagram illustrating a configuration of a second embodiment.

FIG. 7 illustrates the configuration of the second embodiment. An image processing unit 30-2 includes color information generation units 32b and 32C, a color information comparison unit 33b, a comparison information accumulation unit 34b, and a fading information generation unit 35b.

The color information generation unit 32b generates color information, for example, color information indicating a level of each color component of the three primary colors as comparison target information from the image signal generated by the image capturing unit 21, and outputs the color information to the color information comparison unit 33b.

The color information generation unit 32c generates color information from the reference signal generated by the image capturing unit 21 and uses the color information as the comparison target information. In a case where the reference pixel is a pixel provided with no color filter, the color information generation unit 32c generates information indicating a luminance level as the fading determination reference information. Furthermore, in a case where the reference pixel is a pixel provided with a spectral filter, the color information generation unit 32c generates the fading determination reference information indicating the level of each color component equal to the color filter. The color information generation unit 32c outputs the generated fading determination reference information to the color information comparison unit 33b.

The color information comparison unit 33b compares the comparison target information generated by the color information generation unit 32b with the fading determination reference information generated by the color information generation unit 32c. The color information comparison unit 33b generates comparison information indicating a ratio of the comparison target information to the fading determination reference information (fading level) or whether or not fading with the fading level exceeding a predetermined level has occurred.

In a case where the reference pixel is a pixel provided with no color filter, the color information comparison unit 33b calculates color information Lrgb indicating the luminance level as shown in Equation (1) from the color information generated by the color information generation unit 32b (red component R, green component G, and blue component B) as the comparison target information. Note that in Equation (1), a coefficient kr indicates the proportion of the red component, a coefficient kg indicates the proportion of the green component, and a coefficient kb indicates the proportion of the blue component.

$$Lrgb=krR+kgG+kbB \quad (1)$$

The color information comparison unit 33b compares a signal level of the reference pixel provided with no color filter with fading determination reference information Lref, compares the comparison target information Lrgb with the fading determination reference information Lref, and outputs comparison information indicating a comparison result to the comparison information accumulation unit 34b.

In a case where the reference pixel is a pixel provided with a spectral filter, the color information comparison unit 33b compares, for each color component, the comparison target information generated by the color information generation unit 32b (red component R, green component G, and blue component B) with the fading determination reference information generated by the color information generation unit 32c (reference red component Rref, reference green component Gref, and reference blue component Bref). The color information comparison unit 33b outputs the comparison information indicating the comparison result to the comparison information accumulation unit 34b.

Note that in a case where the reference pixel is provided as shown in (a) of FIG. 6, the color information comparison unit 33b can generate the comparison information for each pixel block, for example. Furthermore, in a case where the reference pixel is provided as shown in (b) of FIG. 6, the comparison information can be generated for each pixel block or for each of a plurality of pixel blocks including reference pixels of each color. Furthermore, in a case where the reference pixel is provided as shown in (c) of FIG. 6, for example, the comparison information can be generated for each area having a predetermined line width based on the line of the reference pixel.

The comparison information accumulation unit 34b accumulates the comparison information generated by the color information comparison unit 33b. Furthermore, the comparison information accumulation unit 34b outputs the accumulated comparison information, which is an accumulation result of the comparison information, to the fading information generation unit 35b.

The fading information generation unit 35b performs statistical processing and the like on the accumulated comparison information supplied from the comparison information accumulation unit 34b to calculate fading determination information. For example, on the basis of the accumulated comparison information, when it is shown by the most recently accumulated comparison information that fading has occurred more than a predetermined level set in advance, the fading information generation unit 35b calculates a duration period and the number of continuations of a comparison result indicating that fading has occurred more than the predetermined level as the fading determination information. In a case where the duration period and the number of continuations of the comparison result indicating that fading has occurred more than the predetermined level exceed a threshold, the fading information generation unit 35b determines that fading has occurred, generates the fading information indicating that the fading has occurred, and outputs the fading information to a fading information utilization unit 50. Furthermore, the fading information generation unit 35b may not only indicate that fading has occurred with the fading information, but also include the fading level in the fading information.

Note that the comparison information accumulation unit 34b is not an essential component, and the comparison information generated by the color information comparison unit 33b may be output to the fading information generation unit 35b. In a case where the comparison information accumulation unit 34b is provided, even if the comparison information generated by the color information comparison unit 33b varies, stable fading information can be generated on the basis of the accumulated comparison information. Furthermore, in a case where the comparison information accumulation unit 34b is not provided, the configuration of the image processing unit 30-2 can be simplified.

3-2. Operation of Second Embodiment

Figure 8:
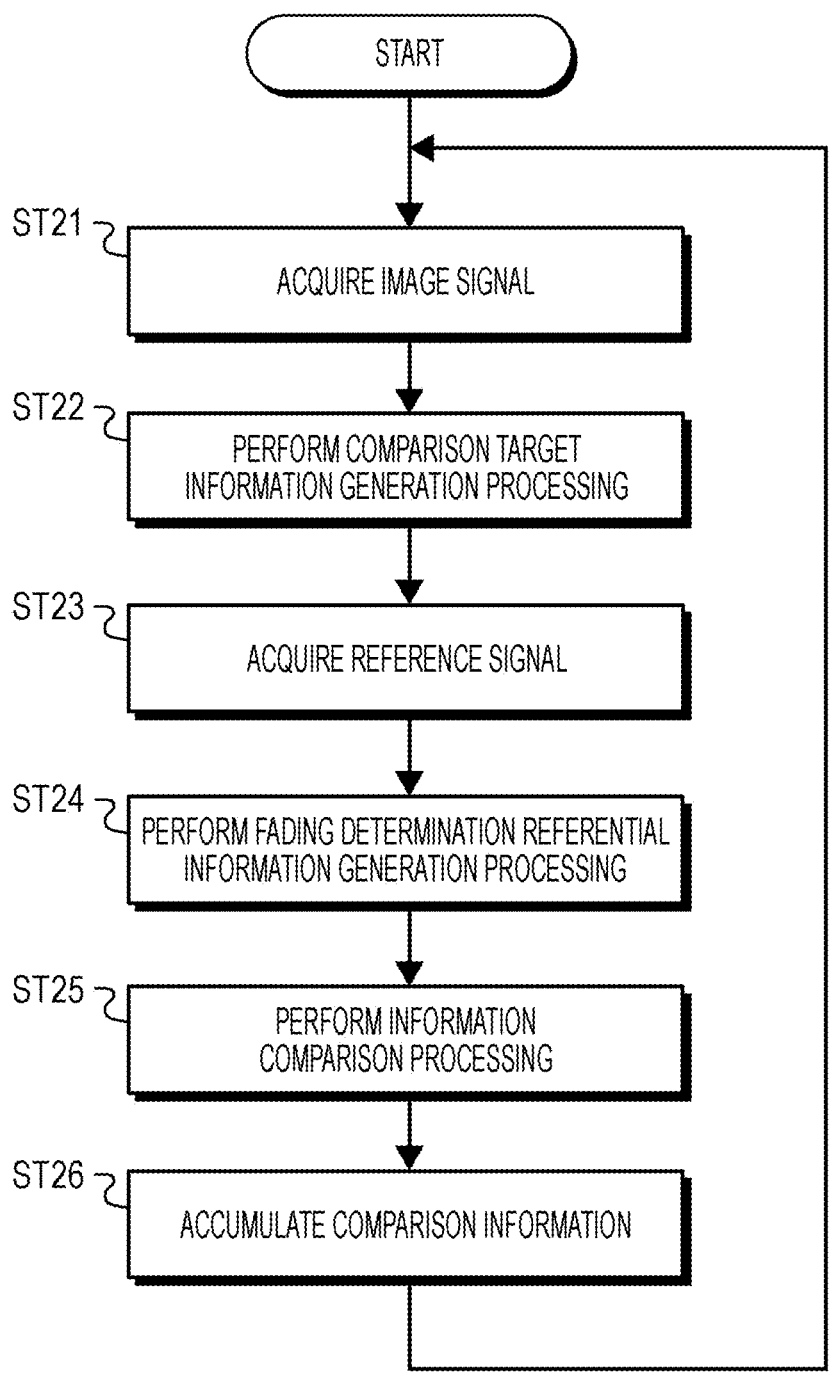
FIG. 8 is a flowchart illustrating an operation of the second embodiment.
Figure 9:
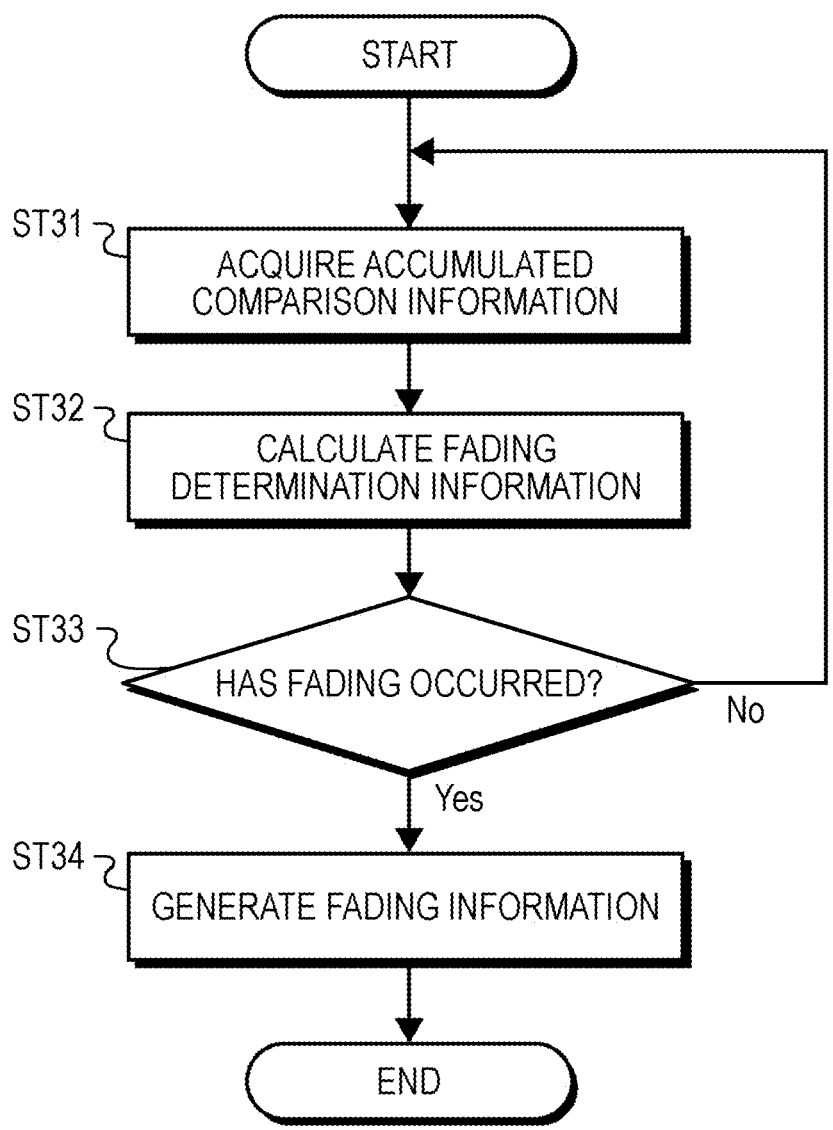
FIG. 9 is a flowchart illustrating the operation of the second embodiment.

FIGS. 8 and 9 are flowcharts illustrating operations of the second embodiment, FIG. 8 shows an operation of processing information to be used for determining fading, and FIG. 9 shows an operation of generating fading information. The operation of processing information to be used for determining fading is performed during an operation of the image capturing unit, and the operation of generating the fading information is performed at predetermined period intervals.

In step ST21 of FIG. 8, the image processing unit acquires an image signal. The image processing unit 30-2 acquires the image signal generated by the image capturing unit 21 and proceeds to step ST22.

In step ST22, the image processing unit performs comparison target information generation processing. On the basis of the image signal acquired in step ST21, the image processing unit 30-2 generates color information indicating luminance or a signal level for each color component as comparison target information, and proceeds to step ST23.

In step ST23, the image processing unit acquires a reference signal. The image processing unit 30-2 acquires the reference signal generated by the image capturing unit 21 and proceeds to step ST24.

In step ST24, the image processing unit performs fading determination referential information generation processing. On the basis of the reference signal acquired in step ST23, the image processing unit 30-2 generates color information indicating luminance or a signal level for each color component as the fading determination reference information, and proceeds to step ST25.

In step ST25, the image processing unit performs information comparison processing. The image processing unit 30-2 compares the comparison target information generated in step ST22 with the fading determination reference information generated in step ST24 to generate comparison information on the basis of a comparison result, and proceeds to step ST26.

In step ST26, the image processing unit performs comparison information accumulation processing. The image processing unit 30-2 accumulates the comparison information generated in step ST25, and returns to step ST21.

In step ST31 of FIG. 9, the image processing unit acquires accumulated comparison information. The image processing unit 30-2 acquires the accumulated comparison information generated by accumulating the comparison information by the comparison information accumulation processing in step ST26 of FIG. 8, and proceeds to step ST32.

In step ST32, the image processing unit calculates fading determination information. The image processing unit 30-2 calculates the fading determination information on the basis of the accumulated comparison information acquired in step ST31. The image processing unit 30-2 calculates, for example, the duration period and the number of continuations of a comparison result indicating that fading has occurred more than a predetermined level as the fading determination information, and proceeds to step ST33.

In step ST33, the image processing unit determines whether or not fading has occurred. The image processing unit 30-2 determines whether or not the fading determination information calculated in step ST32 exceeds a threshold set in advance, proceeds to step ST34 in a case where it is determined on the basis of the fading determination information that fading exceeding the threshold has occurred, or returns to step ST31 in a case where it is determined on the basis of the fading determination information that no fading exceeding the threshold has occurred.

In step ST34, the image processing unit generates fading information. The image processing unit 30-2 generates the fading information indicating that fading exceeding a threshold has occurred in the color filter used in the image capturing unit 20, and the like.

In this way, the second embodiment allows the fading state to be detected with precision, in a similar manner to the first embodiment. Furthermore, since fading can be determined on the basis of the image signal and the reference signal generated by the image capturing unit 21, fading of the color filter can be detected without using information and the like acquired by an external device.

4. Third Embodiment

Next, a third embodiment of the present technology will be described. The third embodiment shows a case of using: cumulative illuminance information that accumulates illuminance information generated on the basis of an image signal and cumulative environmental information that accumulates environmental information as comparison target information; and information indicating a relationship between a fading level of a color filter and an accumulation result of the illuminance information and the environmental information as fading determination reference information.

4-1. Configuration of Third Embodiment

Figure 10:
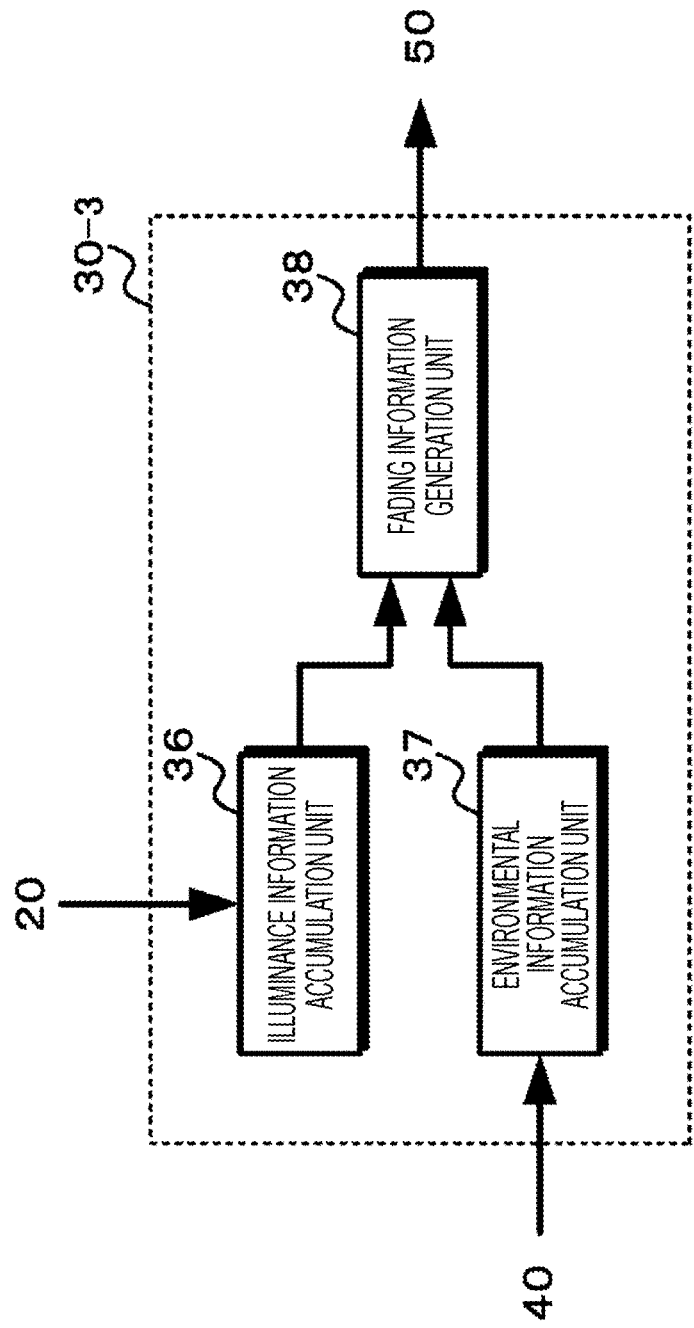
FIG. 10 is a diagram illustrating a configuration of a third embodiment.

FIG. 10 illustrates the configuration of the third embodiment. An image processing unit 30-3 includes an illuminance information accumulation unit 36, an environmental information accumulation unit 37, and a fading information generation unit 38.

The illuminance information accumulation unit 36 generates illuminance information on the basis of an image signal supplied from an image capturing unit 20. The illuminance information accumulation unit 36 accumulates, for example, an average value of a pixel value in a captured image as the illuminance information, and outputs a temporal integral value of the illuminance information from the first use of a color filter of the image capturing unit 20 to date as cumulative illuminance information to the fading information generation unit 38.

The environmental information accumulation unit 37 accumulates environmental information supplied from an environmental information generation unit 40, for example, a temperature measurement value, and outputs a temporal integral value of the temperature measurement value from the first use of the color filter of the image capturing unit 20 to date as cumulative environmental information to the fading information generation unit 38. Note that the environmental information accumulation unit may use not only the temperature measurement value but also a humidity measurement value as the environmental information.

The fading information generation unit 38 determines whether or not fading exceeding a predetermined level set in advance has occurred on the basis of the cumulative illuminance information supplied by the illuminance information accumulation unit 36 and cumulative temperature information supplied by the environmental information accumulation unit 37. The fading information generation unit 38 stores in advance characteristics indicating the fading level with respect to the cumulative illuminance information and the cumulative temperature information (fading model and the like) as the fading determination reference information. By using the characteristics, the fading information generation unit 38 determines the fading level on the basis of the cumulative illuminance information supplied by the illuminance information accumulation unit 36 and the cumulative temperature information supplied by the environmental information accumulation unit 37. Furthermore, by individually using characteristics indicating the fading level with respect to the cumulative illuminance information and characteristics indicating the fading level with respect to the cumulative temperature information, the fading level based on the cumulative illuminance information and the fading level based on the cumulative temperature information may be determined, and the fading levels may be integrated into the fading level of the color filter. Moreover, an evaluation value may be calculated by using the cumulative illuminance information and the cumulative temperature information as parameters, and the calculated evaluation value may be used as the fading level. The fading information generation unit 38 compares the determined fading level with a threshold set in advance and generates the fading information indicating whether or not fading exceeding the threshold has occurred on the basis of a comparison result, and outputs the fading information to a fading information utilization unit 50. Furthermore, the fading information generation unit 38 may not only indicate that fading has occurred with the fading information, but also include the fading level in the fading information.

4-2. Operation of Third Embodiment

Figure 11:
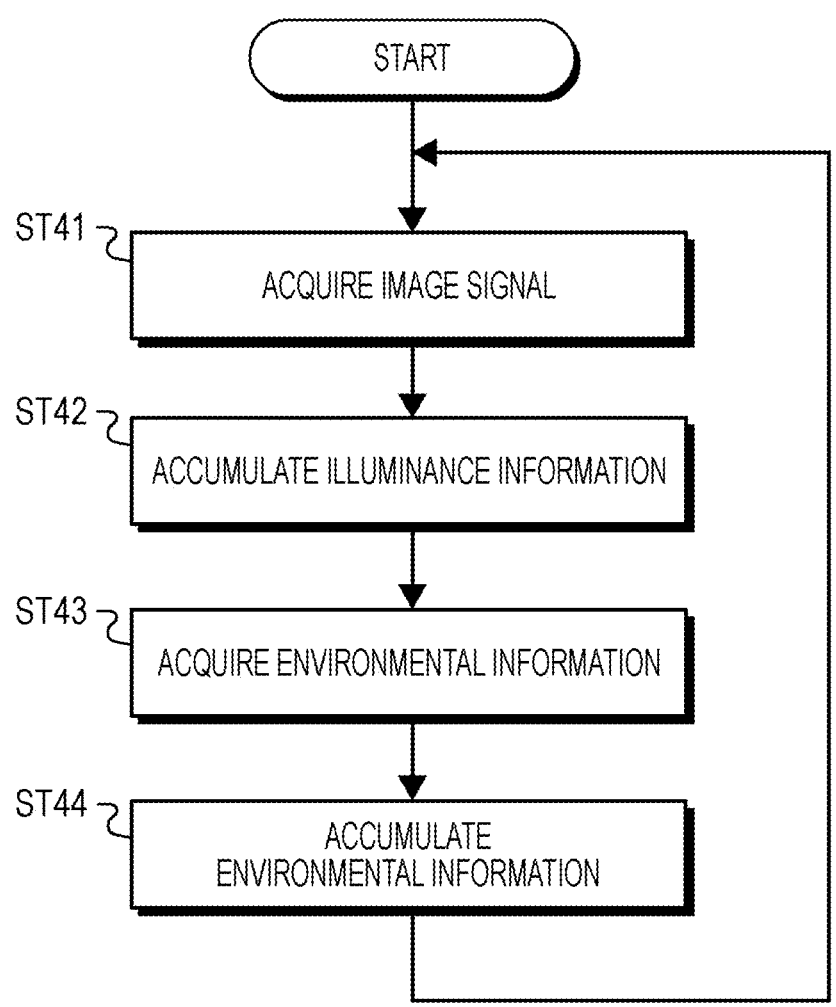
FIG. 11 is a flowchart illustrating an operation of the third embodiment.
Figure 12:
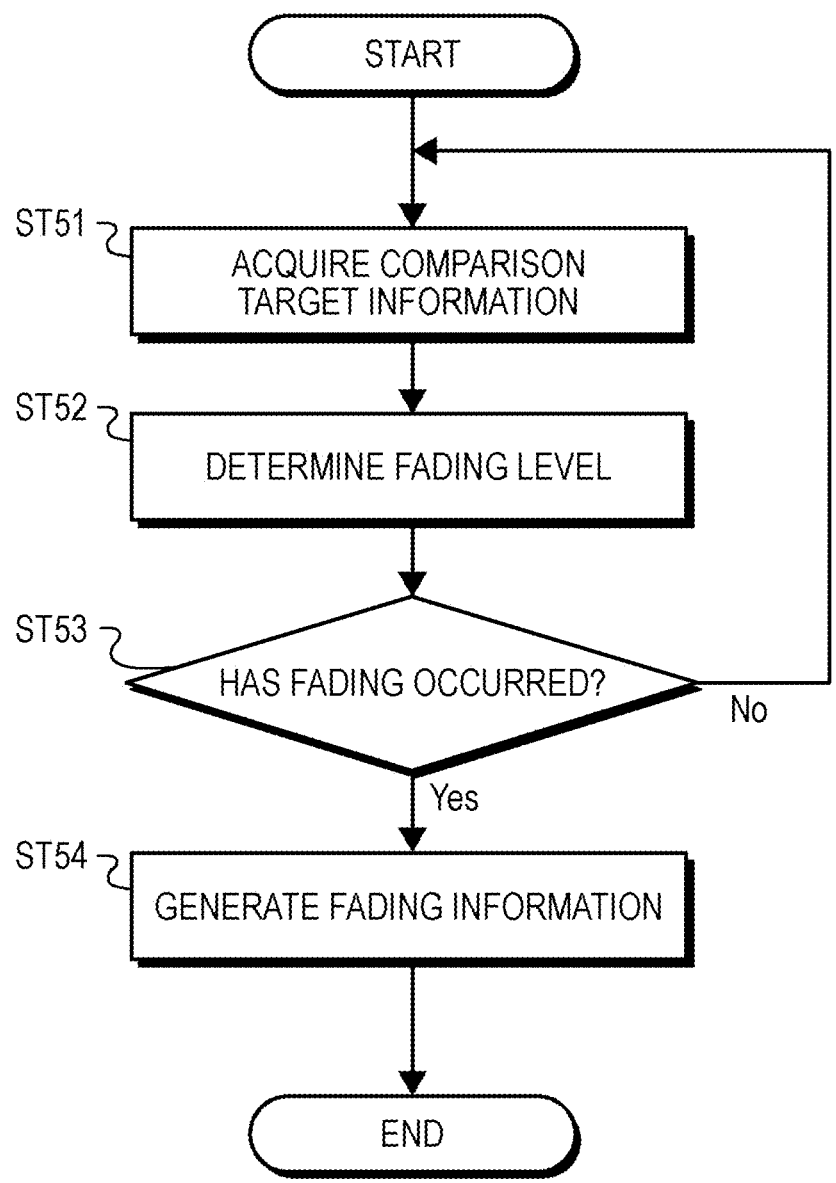
FIG. 12 is a flowchart illustrating the operation of the third embodiment.

FIGS. 11 and 12 are flowcharts illustrating operations of the third embodiment, FIG. 11 shows an operation of processing information to be used for determining fading, and FIG. 12 shows an operation of generating fading information. The operation of processing information to be used for determining fading is performed during an operation of the image capturing unit, and the operation of generating the fading information is performed at predetermined period intervals.

In step ST41 of FIG. 11, the image processing unit acquires an image signal. The image processing unit 30-3 acquires the image signal generated by the image capturing unit 20 and proceeds to step ST42.

In step ST42, the image processing unit accumulates illuminance information. The image processing unit 30-3 generates the illuminance information on the basis of the image signal acquired in step ST41. Moreover, the image processing unit 30-3 accumulates the illuminance information and proceeds to step ST43.

In step ST43, the image processing unit acquires environmental information. The image processing unit 30-3 acquires the environmental information generated by the environmental information generation unit 40 and proceeds to step ST44.

In step ST44, the image processing unit accumulates the environmental information. The image processing unit 30-3 accumulates the environmental information acquired in step ST43 and returns to step ST41.

In step ST51 of FIG. 12, the image processing unit acquires comparison target information. The image processing unit 30-3 acquires the illuminance information accumulated in step ST42 of FIG. 11 and the environmental information accumulated in step ST44 as the comparison target information, and proceeds to step ST52.

In step ST52, the image processing unit estimates to determine the fading level. The image processing unit 30-3 uses the fading determination reference information indicating the fading level for the cumulative illuminance information and the cumulative temperature information to determine the fading level corresponding to the comparison target information acquired in step ST51, and proceeds to step ST53.

In step ST53, the image processing unit determines whether or not fading has occurred. The image processing unit 30-3 determines whether or not the fading level determined in step ST52 exceeds a threshold set in advance, proceeds to step ST54 in a case where it is determined that fading exceeding the threshold has occurred, or returns to step ST51 in a case where it is determined that no fading exceeding the threshold has occurred.

In step ST54, the image processing unit generates fading information. The image processing unit 30-3 generates the fading information indicating that fading exceeding the threshold has occurred in the color filter used in the image capturing unit 20, and outputs the fading information.

In this way, the third embodiment allows the fading state to be detected with precision, in a similar manner to the first and second embodiments. Furthermore, by using the cumulative illuminance information that accumulates the illuminance information generated on the basis of the image signal or the cumulative environmental information that accumulates the cumulative illuminance information and the environmental information as the comparison target information, it is possible to determine fading on the basis of the fading determination reference information indicating the relationship between the fading level of the color filter and the accumulation result of the illuminance information and the environmental information, and the comparison target information. Therefore, fading of the color filter can be easily detected without performing recognition processing and the like.

5. Other Embodiments

The image processing unit 30 may execute the first to third embodiments in combination. For example, if the first embodiment and the third embodiment are executed in combination, even in a case where an object without fading cannot be detected for a long period of time, fading of the color filter can be detected on the basis of the cumulative illuminance information and the like.

Furthermore, in the second embodiment, the image capturing unit 21 is provided with the reference pixel in which fading does not occur, and the fading determination reference information is generated. A spectral camera may be provided separately from the image capturing unit, and the fading determination reference information may be generated by the spectral camera.

Note that effects described in the first to third embodiments described above and other embodiments are merely illustrative and not restrictive, and additional effects may be produced.

6. About Fading Information Utilization Unit

Next, the fading information utilization unit will be described. In a case where the fading situation is obtained by the image processing unit 30, the fading information utilization unit 50 performs fading correction on the image signal acquired by the image capturing unit 20.

The image processing unit 30 performs fading correction using a correction coefficient according to the fading level of the color filter. For example, a red correction coefficient Cr, a green correction coefficient Cg, and a blue correction coefficient Cb are determined according to the fading level. Moreover, calculations (2) to (4) are performed on a red component R, a green component G, and a blue component B in the image signal generated by the image capturing unit 20, and a red component Rc, a green component Gc, and a blue component Bc with fading corrected are calculated.

$$Rc = Cr \times R \quad (2)$$

$$Gc = Cg \times G \quad (3)$$

$$Bc = Cb \times B \quad (4)$$

Furthermore, since the fading level can be estimated using the characteristics indicating the fading level with respect to the cumulative illuminance and the cumulative temperature (fading model and the like), fading may be corrected by using a look-up table. For example, by using a red look-up table LUTr according to the fading level as shown in Equation (5), the red component Rc after fading correction corresponding to the red component R is calculated. Similarly, by using a green look-up table LUTg according to the fading level as shown in Equation (6), the green component Gc after fading correction corresponding to the green component G is calculated, and by using a blue look-up table LUTb according to the fading level as shown in Equation (7), the blue component Bc after fading correction corresponding to the blue component B is calculated.

$$Rc = \text{LUT}r[R] \quad (5)$$

$$Gc = \text{LUT}g[G] \quad (6)$$

$$Bc = \text{LUT}b[B] \quad (7)$$

Moreover, the image processing unit 30 may calculate respective color components Rc, Gc, and Bc after fading correction for each pair of color components R, G, and B, not limited to a case where fading correction is performed for each color component. For example, the calculation of Equation (8) may be performed using a correction coefficient Cw according to the fading level to calculate respective color components Rc, Gc, and Bc. As shown in Equations (9) to (11), each color component after fading correction may be calculated.

$$[Rc, Gc, Bc]^T = Cw[R, G, B]^T \quad (8)$$

$$Rc = \text{LUT}r[R, G, B] \quad (9)$$

$$Gc = \text{LUT}g[R, G, B] \quad (10)$$

$$Bc = \text{LUT}b[R, G, B] \quad (11)$$

Furthermore, the fading correction may be performed by machine learning. For example, using a method of the category called "conditional generative adversarial networks (GAN)", the rule for converting images and conversion of faded color into original color are learned, and an image in which fading has occurred is converted into an image without fading on the basis of a learning result. Furthermore, in machine learning, the method called "Pix2Pix" may be used to learn in advance the relationship between an image without fading and an image in which fading has occurred, and the image without fading may be generated from the image in which fading has occurred acquired by the image capturing unit on the basis of the learned relationship. Furthermore, the image without fading may be generated by using the method called "Cycle GAN".

7. Application Example

The technology according to the present disclosure can be applied to various products. For example, the technology according to the present disclosure may be implemented as a device mounted on any type of mobile body including automobiles, electric vehicles, hybrid electric vehicles, motorcycles, bicycles, personal mobility, airplanes, drones, ships, robots, construction machines, agricultural machines (tractors), and the like.

Figure 13:
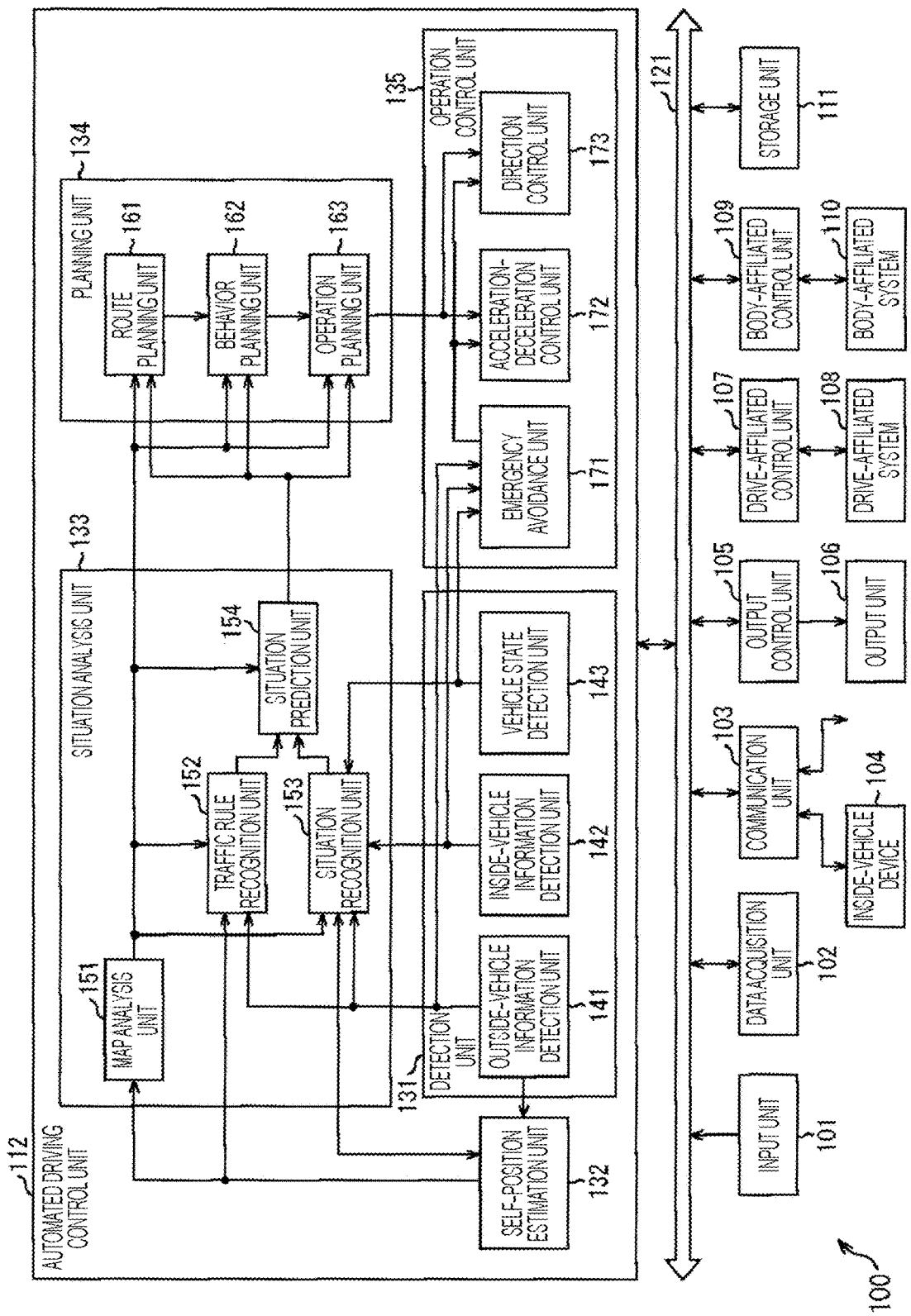
FIG. 13 is a block diagram showing a schematic functional configuration example of a vehicle control system.

FIG. 13 is a block diagram showing a schematic functional configuration example of a vehicle control system 100, which is one example of a mobile body control system to which the present technology can be applied.

Note that hereinafter, in a case where a vehicle provided with the vehicle control system 100 is distinguished from other vehicles, the vehicle is referred to as own vehicle or self vehicle.

The vehicle control system 100 includes an input unit 101, a data acquisition unit 102, a communication unit 103, an inside-vehicle device 104, an output control unit 105, an output unit 106, a drive-affiliated control unit 107, a drive-affiliated system 108, a body-affiliated control unit 109, a body-affiliated system 110, a storage unit 111, and an automated driving control unit 112. The input unit 101, the data acquisition unit 102, the communication unit 103, the output control unit 105, the drive-affiliated control unit 107, the body-affiliated control unit 109, the storage unit 111, and the automated driving control unit 112 are connected to each other via a communication network 121. The communication network 121 includes, for example, a vehicle-mounted communication network, a bus, and the like conforming to arbitrary standards such as controller area network (CAN), local interconnect network (LIN), local area network (LAN), or FlexRay (registered trademark). Note that each unit of the vehicle control system 100 may be directly connected without going through the communication network 121.

Note that hereinafter, in a case where each unit of the vehicle control system 100 performs communication via the communication network 121, the description of the communication network 121 will be omitted. For example, in a case where the input unit 101 and the automated driving control unit 112 communicate with each other via the communication network 121, it is simply described that the input unit 101 and the automated driving control unit 112 communicate with each other.

The input unit 101 includes a device to be used by an occupant to input various data, instructions, and the like. For example, the input unit 101 includes an operation device such as a touch panel, a button, a microphone, a switch, and a lever, and an operation device and the like that allows input by a method other than manual operation such as voice and gesture. Furthermore, for example, the input unit 101 may be a remote control device using infrared rays or other radio waves, or may be an externally connected device including a mobile device, a wearable device, or the like that supports the operation of the vehicle control system 100. The input unit 101 generates an input signal on the basis of data, instructions, and the like input by an occupant, and supplies the input signal to each unit of the vehicle control system 100.

The data acquisition unit 102 includes various sensors and the like that acquire data to be used for processing by the vehicle control system 100, and supplies the acquired data to each unit of the vehicle control system 100.

For example, the data acquisition unit 102 includes various sensors for detecting the state of the own vehicle and the like. Specifically, for example, the data acquisition unit 102 includes a gyro sensor, an acceleration sensor, an inertial measurement unit (IMU), and sensors and the like for detecting an accelerator pedal operation amount, a brake pedal operation amount, a steering wheel steering angle, the number of engine rotations, the number of motor rotations, a wheel rotation speed, or the like.

Furthermore, for example, the data acquisition unit 102 includes various sensors for detecting information outside the own vehicle. Specifically, for example, the data acquisition unit 102 includes an image capturing device such as a time of flight (ToF) camera, a stereo camera, a monocular camera, an infrared camera, and other cameras. Furthermore, for example, the data acquisition unit 102 includes an environmental sensor for detecting the weather, atmospheric phenomena, or the like, and a surrounding information detection sensor for detecting an object around the own vehicle. The environmental sensor includes, for example, a raindrop sensor, a fog sensor, a sunshine sensor, a snow sensor, and the like. The surrounding information detection sensor includes, for example, an ultrasonic wave sensor, a radar, a light detection and ranging, laser imaging detection and ranging (LiDAR), a sonar, and the like.

Moreover, for example, the data acquisition unit 102 includes various sensors for detecting the current position of the own vehicle. Specifically, for example, the data acquisition unit 102 includes a global navigation satellite system (GNSS) receiver and the like that receive a GNSS signal from a GNSS satellite.

Furthermore, for example, the data acquisition unit 102 includes various sensors for detecting inside-vehicle information. Specifically, for example, the data acquisition unit 102 includes an image capturing device that captures an image of a driver, a biometric sensor that detects biometric information on the driver, a microphone that collects voice inside the vehicle, and the like. The biometric sensor is provided, for example, on a seat surface, a steering wheel, or the like, and detects biometric information on an occupant seated on a seat or a driver holding the steering wheel.

The communication unit 103 communicates with the inside-vehicle device 104 and various devices, servers, base stations, and the like outside the vehicle. The communication unit 103 transmits data supplied from each unit of the vehicle control system 100, and supplies the received data to each unit of the vehicle control system 100. Note that the communication protocol supported by the communication unit 103 is not particularly limited, and furthermore, the communication unit 103 can support a plurality of types of communication protocols.

For example, the communication unit 103 performs wireless communication with the inside-vehicle device 104 by wireless LAN, Bluetooth (registered trademark), near field communication (NFC), wireless USB (WUSB), or the like. Furthermore, for example, the communication unit 103 performs wired communication with the inside-vehicle device 104 via a connection terminal (not shown) (and a cable if necessary) by universal serial bus (USB), high-definition multimedia interface (HDMI) (registered trademark), mobile high-definition link (MHL), or the like.

Moreover, for example, the communication unit 103 performs communication with a device (for example, application server or control server) existing on an external network (for example, the Internet, a cloud network, or a network peculiar to a business operator) via a base station or access point. Furthermore, for example, the communication unit 103 performs communication with a terminal existing near the own vehicle (for example, pedestrian terminal or store terminal, or machine type communication (MTC) terminal) by using peer to peer (P2P) technology. Moreover, for example, the communication unit 103 performs V2X communication including vehicle-to-vehicle communication, vehicle-to-infrastructure communication, vehicle-to-home communication, vehicle-to-pedestrian communication, and the like. Furthermore, for example, the communication unit 103 includes a beacon receiving unit, receives radio waves or electromagnetic waves transmitted from a wireless station and the like installed on a road, and acquires information including the current position, traffic congestion, traffic regulations, required time, or the like.

The inside-vehicle device 104 includes, for example, a mobile device or a wearable device owned by an occupant, an information device carried in or attached to the own vehicle, a navigation device for searching for a route to an arbitrary destination, and the like.

The output control unit 105 controls output of various pieces of information to the occupant of the own vehicle or the outside of the vehicle. For example, the output control unit 105 generates an output signal including at least one of visual information (for example, image data) or auditory information (for example, voice data) and supplies the output signal to the output unit 106, thereby controlling the output of the visual information and the auditory information from the output unit 106. Specifically, for example, the output control unit 105 combines image data captured by different image capturing devices of the data acquisition unit 102 to generate a bird's-eye image, a panoramic image, or the like, and supplies the output signal including the generated image to the output unit 106. Furthermore, for example, the output control unit 105 generates voice data including a warning sound, a warning message, or the like for dangers including collision, scrape, entry into a danger zone, and the like, and supplies the output signal including the generated voice data to the output unit 106.

The output unit 106 includes a device that can output visual information or auditory information to an occupant of the own vehicle or the outside of the vehicle. For example, the output unit 106 includes a display device, an instrument panel, an audio speaker, a headphone, a wearable device including a glasses-type display worn by an occupant and the like, a projector, a lamp, and the like. In addition to a device having a regular display, the display device included in the output unit 106 may be, for example, a device that displays visual information within the field of view of the driver, including a head-up display, a transmissive display, a device having an augmented reality (AR) display function, and the like.

The drive-affiliated control unit 107 generates various control signals and supplies the control signals to the drive-affiliated system 108, thereby controlling the drive-affiliated system 108. Furthermore, the drive-affiliated control unit 107 supplies a control signal to each unit other than the drive-affiliated system 108 as necessary, and performs notification of the control state of the drive-affiliated system 108, and the like.

The drive-affiliated system 108 includes drive-affiliated various devices of the own vehicle. For example, the drive-affiliated system 108 includes a driving force generation device for generating driving force including an internal combustion engine, driving motor, or the like, a driving force transmission mechanism for transmitting the driving force to wheels, a steering mechanism that adjusts the steering angle, a braking device that generates braking force, an antilock brake system (ABS), an electronic stability control (ESC), an electric power steering device, and the like.

The body-affiliated control unit 109 generates various control signals and supplies the control signals to the body-affiliated system 110, thereby controlling the body-affiliated system 110. Furthermore, the body-affiliated control unit 109 supplies a control signal to each unit other than the body-affiliated system 110 as necessary, and performs notification of the control state of the body-affiliated system 110, and the like.

The body-affiliated system 110 includes various body-affiliated devices equipped in the vehicle body. For example, the body-affiliated system 110 includes a keyless entry system, a smart key system, a power window device, a power seat, a steering wheel, an air conditioner, various lamps (for example, head lamp, reverse lamp, stop lamp, direction indicator lamp, fog lamp, and the like), and the like.

The storage unit 111 includes, for example, a read only memory (ROM), a random access memory (RAM), a magnetic storage device such as a hard disc drive (HDD), a semiconductor storage device, an optical storage device, an optical magnetic storage device, and the like. The storage unit 111 stores various programs, data, and the like to be used by each unit of the vehicle control system 100. For example, the storage unit 111 stores map data including a three-dimensional high-precision map such as a dynamic map, a global map that has precision lower than the high-precision map and covers a large area, a local map that includes information around the own vehicle, and the like.

The automated driving control unit 112 controls automated driving including autonomous traveling, driving assistance, or the like. Specifically, for example, the automated driving control unit 112 performs cooperative control aimed at implementing functions of an advanced driver assistance system (ADAS) including collision avoidance or impact mitigation of the own vehicle, follow-up traveling based on distance between vehicles, traveling while maintaining vehicle speed, collision warning of the own vehicle, lane deviation warning of the own vehicle, or the like. Furthermore, for example, the automated driving control unit 112 performs cooperative control aimed at automated driving and the like in which the vehicle autonomously travels without depending on the operation of the driver. The automated driving control unit 112 includes a detection unit 131, a self-position estimation unit 132, a situation analysis unit 133, a planning unit 134, and an operation control unit 135.

The detection unit 131 detects various types of information necessary for controlling automated driving. The detection unit 131 includes an outside-vehicle information detection unit 141, an inside-vehicle information detection unit 142, and a vehicle state detection unit 143.

The outside-vehicle information detection unit 141 performs detection processing on information outside the own vehicle on the basis of data or signals from each unit of the vehicle control system 100. For example, the outside-vehicle information detection unit 141 performs detection processing, recognition processing, and tracking processing on an object around the own vehicle, and detection processing on the distance to the object. The object to be detected includes, for example, a vehicle, a person, an obstacle, a structure, a road, a traffic light, a traffic sign, a road marking, and the like. Furthermore, for example, the outside-vehicle information detection unit 141 performs detection processing on the environment around the own vehicle. The surrounding environment to be detected includes, for example, weather, temperature, humidity, brightness, road surface condition, and the like. The outside-vehicle information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

The inside-vehicle information detection unit 142 performs detection processing on information inside the vehicle on the basis of data or signals from each unit of the vehicle control system 100. For example, the inside-vehicle information detection unit 142 performs driver authentication processing and recognition processing, driver state detection processing, occupant detection processing, inside-vehicle environment detection processing, and the like. The driver state to be detected includes, for example, physical condition, awakened degree, concentration, fatigue, line-of-sight direction, and the like. The inside-vehicle environment to be detected includes, for example, temperature, humidity, brightness, smell, and the like. The inside-vehicle information detection unit 142 supplies data indicating the result of detection processing to the situation recognition unit 153 of the situation analysis unit 133, the emergency avoidance unit 171 of the operation control unit 135, and the like.

The vehicle state detection unit 143 performs detection processing on the state of the own vehicle on the basis of data or signals from each unit of the vehicle control system 100. The state of the own vehicle to be detected includes, for example, speed, acceleration level, steering angle, presence or absence and details of abnormality, driving operation state, power seat position and tilt, door lock state, state of other vehicle-mounted devices, and the like. The vehicle state detection unit 143 supplies data indicating the result of detection processing to the situation recognition unit 153 of the situation analysis unit 133, the emergency avoidance unit 171 of the operation control unit 135, and the like.

The self-position estimation unit 132 performs estimation processing on the position, orientation, and the like of the own vehicle on the basis of data or signals from each unit of the vehicle control system 100 such as the outside-vehicle information detection unit 141 and the situation recognition unit 153 of the situation analysis unit 133. Furthermore, the self-position estimation unit 132 generates a local map to be used for self-position estimation as necessary (hereinafter referred to as self-position estimation map). The self-position estimation map is, for example, a high-precision map using a technique such as simultaneous localization and mapping (SLAM). The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 stores the self-position estimation map in the storage unit 111.

The situation analysis unit 133 performs analysis processing on the own vehicle and the surrounding situation. The situation analysis unit 133 includes the map analysis unit 151, the traffic rule recognition unit 152, the situation recognition unit 153, and a situation prediction unit 154.

The map analysis unit 151 performs analysis processing on various maps stored in the storage unit 111, and constructs a map including information necessary for the processing of automated driving while using, as necessary, data or signals from each unit of the vehicle control system 100 such as the self-position estimation unit 132, and the outside-vehicle information detection unit 141. The map analysis unit 151 supplies the constructed map to the traffic rule recognition unit 152, the situation recognition unit 153, the situation prediction unit 154, and a route planning unit 161, a behavior planning unit 162, and an operation planning unit 163 of the planning unit 134, and the like.

The traffic rule recognition unit 152 performs recognition processing on traffic rules around the own vehicle on the basis of data or signals from each unit of the vehicle control system 100 such as the self-position estimation unit 132, the outside-vehicle information detection unit 141, and the map analysis unit 151. By the recognition processing, for example, the position and state of traffic lights around the own vehicle, detailed traffic regulation around the own vehicle, lanes that can be traveled, and the like are recognized. The traffic rule recognition unit 152 supplies data indicating a result of the recognition processing to the situation prediction unit 154 and the like.

The situation recognition unit 153 performs recognition processing on the situation of the own vehicle on the basis of data or signals from each unit of the vehicle control system 100 such as the self-position estimation unit 132, the outside-vehicle information detection unit 141, the inside-vehicle information detection unit 142, the vehicle state detection unit 143, and the map analysis unit 151. For example, the situation recognition unit 153 performs recognition processing on the situation of the own vehicle, the situation around the own vehicle, the situation of the driver of the own vehicle, and the like. Furthermore, the situation recognition unit 153 generates, as necessary, a local map to be used for recognizing the situation around the own vehicle (hereinafter referred to as situation recognition map). The situation recognition map is, for example, an occupancy grid map.

The situation of the own vehicle to be recognized includes, for example, the position, orientation, movement of the own vehicle (for example, speed, acceleration level, moving direction, and the like), the presence or absence and details of abnormality, and the like. The situation around the own vehicle to be recognized includes, for example, the type and position of a surrounding stationary object, the type, position, and movement of a surrounding moving object (for example, speed, acceleration level, moving direction, and the like), configuration of surrounding roads and road surface conditions, surrounding weather, temperature, humidity, brightness, and the like. The driver state to be recognized includes, for example, physical condition, awakened degree, concentration, fatigue, movement of line-of-sight, driving operation, and the like.

The situation recognition unit 153 supplies data indicating a result of the recognition processing (including situation recognition map, as necessary) to the self-position estimation unit 132, the situation prediction unit 154, and the like. Furthermore, the situation recognition unit 153 stores the situation recognition map in the storage unit 111.

The situation prediction unit 154 performs situation prediction processing regarding the own vehicle on the basis of data or signals from each unit of the vehicle control system 100 such as the map analysis unit 151, the traffic rule recognition unit 152, and the situation recognition unit 153. For example, the situation prediction unit 154 performs prediction processing on the situation of the own vehicle, the situation around the own vehicle, the situation of the driver, and the like.

The situation of the own vehicle to be predicted includes, for example, action of the own vehicle, occurrence of abnormality, distance to empty, and the like. The situation around the own vehicle to be predicted includes, for example, action of a moving object around the own vehicle, change in the state of traffic lights, change in the environment such as the weather, and the like. The situation of the driver to be predicted includes, for example, action and physical condition of the driver, and the like.

The situation prediction unit 154 supplies data indicating a result of the prediction processing to the route planning unit 161, the behavior planning unit 162, and the operation planning unit 163 of the planning unit 134, and the like together with data from the traffic rule recognition unit 152 and the situation recognition unit 153.

The route planning unit 161 plans a route to a destination on the basis of data or signals from each unit of the vehicle control system 100 such as the map analysis unit 151 and the situation prediction unit 154. For example, the route planning unit 161 sets a route from the current position to the designated destination on the basis of the global map. Furthermore, for example, the route planning unit 161 appropriately changes the route on the basis of the situation of traffic congestion, accident, traffic regulation, construction, and the like, physical condition of the driver, and the like. The route planning unit 161 supplies data indicating the planned route to the behavior planning unit 162 and the like.

The behavior planning unit 162 plans the behavior of the own vehicle for safely traveling the route planned by the route planning unit 161 within planned time on the basis of data or signals from each unit of the vehicle control system 100 such as the map analysis unit 151 and the situation prediction unit 154. For example, the behavior planning unit 162 plans start, stop, traveling direction (for example, forward, backward, left turn, right turn, turning, and the like), travel lane, travel speed, passing, and the like. The behavior planning unit 162 supplies data indicating the planned behavior of the own vehicle to the operation planning unit 163 and the like.

The operation planning unit 163 plans the operation of the own vehicle for implementing the behavior planned by the behavior planning unit 162 on the basis of data or signals from each unit of the vehicle control system 100 such as the map analysis unit 151 and the situation prediction unit 154. For example, the operation planning unit 163 plans acceleration, deceleration, travel locus, and the like. The operation planning unit 163 supplies data indicating the planned operation of the own vehicle to an acceleration-deceleration control unit 172, a direction control unit 173, and the like of the operation control unit 135.

The operation control unit 135 controls the operation of the own vehicle. The operation control unit 135 includes the emergency avoidance unit 171, the acceleration-deceleration control unit 172, and the direction control unit 173.

The emergency avoidance unit 171 performs detection processing on emergencies such as collision, scrape, entry into a danger zone, driver abnormality, and vehicle abnormality on the basis of a detection result by the outside-vehicle information detection unit 141, the inside-vehicle information detection unit 142, and the vehicle state detection unit 143. In a case where occurrence of an emergency is detected, the emergency avoidance unit 171 plans the operation of the own vehicle to avoid the emergency such as sudden stop or quick turning. The emergency avoidance unit 171 supplies data indicating the planned operation of the own vehicle to the acceleration-deceleration control unit 172, the direction control unit 173, and the like.

The acceleration-deceleration control unit 172 performs acceleration-deceleration control for implementing the operation of the own vehicle planned by the operation planning unit 163 or the emergency avoidance unit 171. For example, the acceleration-deceleration control unit 172 calculates a control target value for the driving force generation device or the braking device for implementing planned acceleration, deceleration, or sudden stop, and supplies the drive-affiliated control unit 107 with a control command indicating the calculated control target value.

The direction control unit 173 performs direction control for implementing the operation of the own vehicle planned by the operation planning unit 163 or the emergency avoidance unit 171. For example, the direction control unit 173 calculates a control target value for a steering mechanism for implementing a travel locus or quick turning planned by the operation planning unit 163 or the emergency avoidance unit 171, and supplies the drive-affiliated control unit 107 with a control command indicating the calculated control target value.

In the vehicle control system 100 described above, the image capturing unit 20 (21) shown in the present embodiment corresponds to the data acquisition unit 102, and the image processing unit 30-1 (30-2, 30-3) corresponds to the outside-vehicle information detection unit 141. In a case where the image capturing unit 20 (21) and the image processing unit 30-1 (30-2, 30-3) are provided in the vehicle control system 100 and surroundings are captured by the image capturing unit 20 (21) while driving the vehicle, since the image capturing operation is performed by the image capturing unit 20 (21) for a long time, fading is more likely to occur in the color filter than in portable image capturing devices. However, since fading correction and the like can be performed using the fading information generated by the image processing unit 30-1 (30-2, 30-3), the influence of fading of the color filter can be reduced. For example, in a case where color is important in a scene such as recognition processing of a traffic light, road marking, license plate of a car, and the like by using the image signal generated by the image capturing unit, or in a case where precision can be improved in a scene by using color, such as road surface detection, surrounding object recognition, or travel lane recognition processing, in a similar manner to the comparison area detection unit of the first embodiment, recognition processing can be performed with precision by switching the dictionary used for recognition processing on the basis of the fading information.

Furthermore, the present technology may be applied not only to mobile body control systems but also to monitoring systems that perform long-term image capturing operations and the like to reduce the influence of color filter fading and enable monitoring operations and the like.

The series of processes described in the specification can be executed by hardware, software, or a combined configuration of both hardware and software. In a case where processing by software is executed, a program recording the processing sequence is installed in a memory within a computer built in dedicated hardware and executed. Alternatively, the program can be installed and executed in a general-purpose computer that can execute various processes.

For example, the program can be recorded in advance in a hard disk, a solid state drive (SSD), or a read only memory (ROM) serving as a recording medium. Alternatively, the program can be temporarily or permanently stored (recorded) in a removable recording medium including a flexible disk, a compact disc read only memory (CD-ROM), a magneto optical (MO) disk, a digital versatile disc (DVD), a Blu-ray disc (BD) (registered trademark), a magnetic disk, a semiconductor memory card, and the like. Such a removable recording medium can be provided as so-called package software.

Furthermore, besides installation in a computer from a removable recording medium, the program may be transferred from a download site to a computer via a local area network (LAN) or the Internet and the like wirelessly or with a wire. The computer can receive the program transferred in this way and install the program on a recording medium such as a built-in hard disk.

Note that effects described in the present specification are merely illustrative and not restrictive, and additional effects that are not described may be produced. Furthermore, the present technology should not be construed as being limited to the embodiments of the technology described above. The embodiments of this technology disclose the present technology in the form of illustration. It is obvious that those skilled in the art can modify or substitute the embodiments without departing from the spirit of the present technology. That is, in order to determine the spirit of the present technology, the claims should be considered.

Furthermore, the image processing device of the present technology can also have the following configurations.

(1) An image processing device including a fading information generation unit configured to generate fading information indicating fading of a color filter on the basis of comparison target information based on an image signal generated by an image capturing unit using the color filter and fading determination reference information.

(2) The image processing device according to (1), further including:

a color information generation unit configured to generate color information from the image signal and use the color information as the comparison target information; and a color information comparison unit configured to use color information in a case where there is no fading of the color filter as the fading determination reference information and compare the comparison target information with the fading determination reference information, in which the fading information generation unit generates the fading information on the basis of a comparison result by the color information comparison unit.

(3) The image processing device according to (2), further including a comparison area detection unit configured to detect a comparison area indicating an image area of a fading determination object on the basis of the image signal, in which the color information generation unit generates the color information from the image signal of the comparison area detected by the comparison area detection unit and uses the color information as the comparison target information, and the color information comparison unit uses the color information of the fading determination object as the fading determination reference information.

(4) The image processing device according to (3), in which the fading information generation unit estimates a fading level on the basis of the comparison result by the color information comparison unit, and the comparison area detection unit detects the comparison area according to the fading level estimated by the fading information generation unit.

(5) The image processing device according to (3), in which the comparison area detection unit detects the comparison area within an image area set in advance.

(6) The image processing device according to (2), in which the image capturing unit is provided with a color component pixel provided with the color filter and a reference pixel in which fading does not occur, the color information generation unit generates color information from the image signal generated in the color component pixel and uses the color information as the comparison target information, and the color information comparison unit uses color information generated on the basis of a signal of the reference pixel as the fading determination reference information.

(7) The image processing device according to (6), in which the reference pixel includes a pixel provided with no color filter.

(8) The image processing device according to (6), in which the reference pixel includes a pixel provided with a spectral filter instead of the color filter.

(9) The image processing device according to any one of (6) to (8), further including an image capturing unit provided with the color component pixel and the reference pixel.

(10) The image processing device according to any one of (2) to (9), further including a comparison information accumulation unit configured to accumulate comparison information indicating the comparison result by the color information comparison unit, in which the fading information generation unit generates the fading information on the basis of the comparison information accumulated by the comparison information accumulation unit.

(11) The image processing device according to any one of (1) to (10), further including an illuminance information accumulation unit configured to accumulate illuminance information generated on the basis of the image signal, in which the fading information generation unit uses the illuminance information accumulated by the illuminance information accumulation unit as the comparison target information, and uses information indicating a relationship of a fading level of the color filter with an accumulation result of the illuminance information as the fading determination reference information.

(12) The image processing device according to (11), further including an environmental information accumulation unit configured to accumulate environmental information when the image signal is generated and include the environmental information in the comparison target information, in which the fading information generation unit includes the environmental information accumulated by the environmental information accumulation unit in the comparison target information, and uses information indicating a relationship of the fading level of the color filter with an accumulation result of the illuminance information and the environmental information as the fading determination reference information.

(13) The image processing device according to any one of (1) to (12), in which the fading information indicates that a fading level of the color filter exceeds a predetermined level or the fading level of the color filter.

REFERENCE SIGNS LIST

10 Image capturing system
20, 21 Image capturing unit
30, 30-1, 30-2, 30-3 Image processing unit
Comparison area detection unit
32a, 32b, 32c Color information generation unit
33a, 33b Color information comparison unit
34a, 34b Comparison information accumulation unit
35a, 35b, 38 Fading information generation unit
36 Illuminance information accumulation unit
37 Environmental information accumulation unit
40 Environmental information generation unit
50 Fading information utilization unit
60 Image utilization unit

The invention claimed is:

1. An image processing device comprising:
a computer programmed to
generate fading information indicating fading of a color filter on a basis of comparison target information based on an image signal generated by an image capturing unit using the color filter and fading determination reference information;
generate color information from the image signal and use the color information as the comparison target information; and
use color information in a case where there is no fading of the color filter as the fading determination reference information and compare the comparison target information with the fading determination reference information and generate the fading information on a basis of the comparison.

2. The image processing device according to claim 1, wherein the computer is further programmed to
detect a comparison area indicating an image area of a fading determination object on a basis of the image signal,
generate the color information from the image signal of the comparison area detected and use the color information as the comparison target information, and
use the color information of the fading determination object as the fading determination reference information.

3. The image processing device according to claim 2, wherein the computer is further programmed to
estimate a fading level on a basis of the comparison result by the color information comparison unit, and
detect the comparison area according to the fading level estimated.

4. The image processing device according to claim 2, wherein the computer is further programmed to
detect the comparison area within an image area set in advance.

5. The image processing device according to claim 1, wherein the computer is further programmed to
under a condition that a color component pixel is provided with the color filter and a reference pixel in which fading does not occur,
generate color information from the image signal generated in the color component pixel and use the color information as the comparison target information, and
use color information generated on a basis of a signal of the reference pixel as the fading determination reference information.

6. The image processing device according to claim 5, wherein
the reference pixel includes a pixel provided with no color filter.

7. The image processing device according to claim 5, wherein
the reference pixel includes a pixel provided with a spectral filter instead of the color filter.

8. The image processing device according to claim 5, wherein the computer is further programmed to
provide the color component pixel and the reference pixel.

9. The image processing device according to claim 1, wherein the computer is further programmed to
accumulate comparison information indicating the comparison result,
wherein the fading information is generated on a basis of the comparison information accumulated.

10. The image processing device according to claim 1, wherein the computer is further programmed to
accumulate illuminance information generated on a basis of the image signal,
use the illuminance information accumulated as the comparison target information, and use information indicating a relationship of a fading level of the color filter with an accumulation result of the illuminance information as the fading determination reference information.

11. The image processing device according to claim 10, wherein the computer is further programmed to accumulate environmental information when the image signal is generated and include the environmental information in the comparison target information, under a condition that the environmental information accumulated is included in the comparison target information, use information indicating a relationship of the fading level of the color filter with an accumulation result of the illuminance information and the environmental information as the fading determination reference information.

12. The image processing device according to claim 1, wherein the fading information indicates that a fading level of the color filter exceeds a predetermined level or the fading level of the color filter.

* * * * *